United States Patent
Kazmi et al.

(10) Patent No.: US 12,396,027 B2
(45) Date of Patent: Aug. 19, 2025

(54) ADAPTING MAXIMUM ALLOWED CCA FAILURES BASED ON SINGLE OCCASION PERIODICITY

(71) Applicant: TELEFONAKTIEBOLAGET L M ERICSSON (PUBL), Stockholm (SE)

(72) Inventors: Muhammad Kazmi, Sundbyberg (SE); Kazuyoshi Uesaka, Kawasaki (JP); Iana Siomina, Täby (SE); Santhan Thangarasa, Vällingby (SE); Joakim Axmon, Limhamn (SE); Imadur Rahman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 91 days.

(21) Appl. No.: 17/766,499

(22) PCT Filed: Oct. 2, 2020

(86) PCT No.: PCT/IB2020/059273
§ 371 (c)(1),
(2) Date: Apr. 4, 2022

(87) PCT Pub. No.: WO2021/064676
PCT Pub. Date: Apr. 8, 2021

(65) Prior Publication Data
US 2024/0057152 A1 Feb. 15, 2024

Related U.S. Application Data

(60) Provisional application No. 62/910,713, filed on Oct. 4, 2019.

(51) Int. Cl.
*H04W 74/0808* (2024.01)
(52) U.S. Cl.
CPC .............................. *H04W 74/0808* (2013.01)

(58) Field of Classification Search
CPC .................................................. H04W 74/0808
See application file for complete search history.

(56) References Cited

U.S. PATENT DOCUMENTS

2016/0345217 A1* 11/2016 Tabet ................... H04W 36/302
2021/0100031 A1* 4/2021 Cirik ..................... H04W 76/18
(Continued)

FOREIGN PATENT DOCUMENTS

| WO | 2017178973 A1 | 10/2017 |
| WO | 2019031796 A1 | 2/2019 |

OTHER PUBLICATIONS

Spreadtrum Communications , Considerations on UL LBT Failures Handling, R2-1905675, 3GPP TSG-RAN WG2 Meeting #106 Reno, USA, May 13-17, 2019.

*Primary Examiner* — Benjamin Lamont

(57) ABSTRACT

Methods performed by a wireless device and a base station for adapting maximum allowed Clear Channel Assessment (CCA) based on operational occasion periodicity are provided. In examples disclosed herein, a wireless device is configured to determine an operational occasion periodicity of a signal that is subject to CCA. Accordingly, the wireless device can determine an association at least between the determined operational occasion periodicity and a maximum number of allowed CCA failures for communicating the signal. The wireless device can then perform one or more operational tasks based on the determined maximum number of allowed CCA failures. By determining the maximum number of allowed CCA failures, the wireless device can obtain information about downlink CCA failures and use the obtained information for adapting measurements procedures in serving cell operational tasks.

19 Claims, 15 Drawing Sheets

(56) References Cited

U.S. PATENT DOCUMENTS

2021/0243808 A1* 8/2021 Deenoo ................ H04B 17/309
2021/0336735 A1* 10/2021 Cui ....................... H04L 5/0007
2022/0061116 A1* 2/2022 Lim ...................... H04W 24/08
2022/0094497 A1* 3/2022 Shibaike ............... H04L 1/0027

* cited by examiner

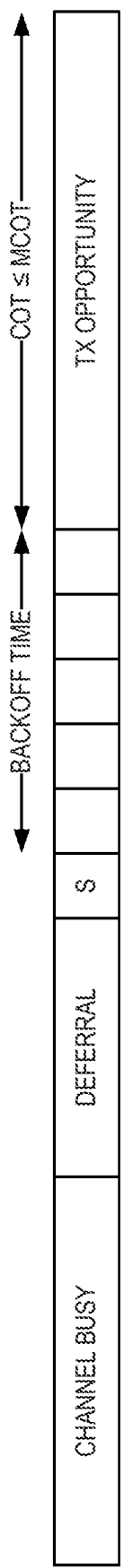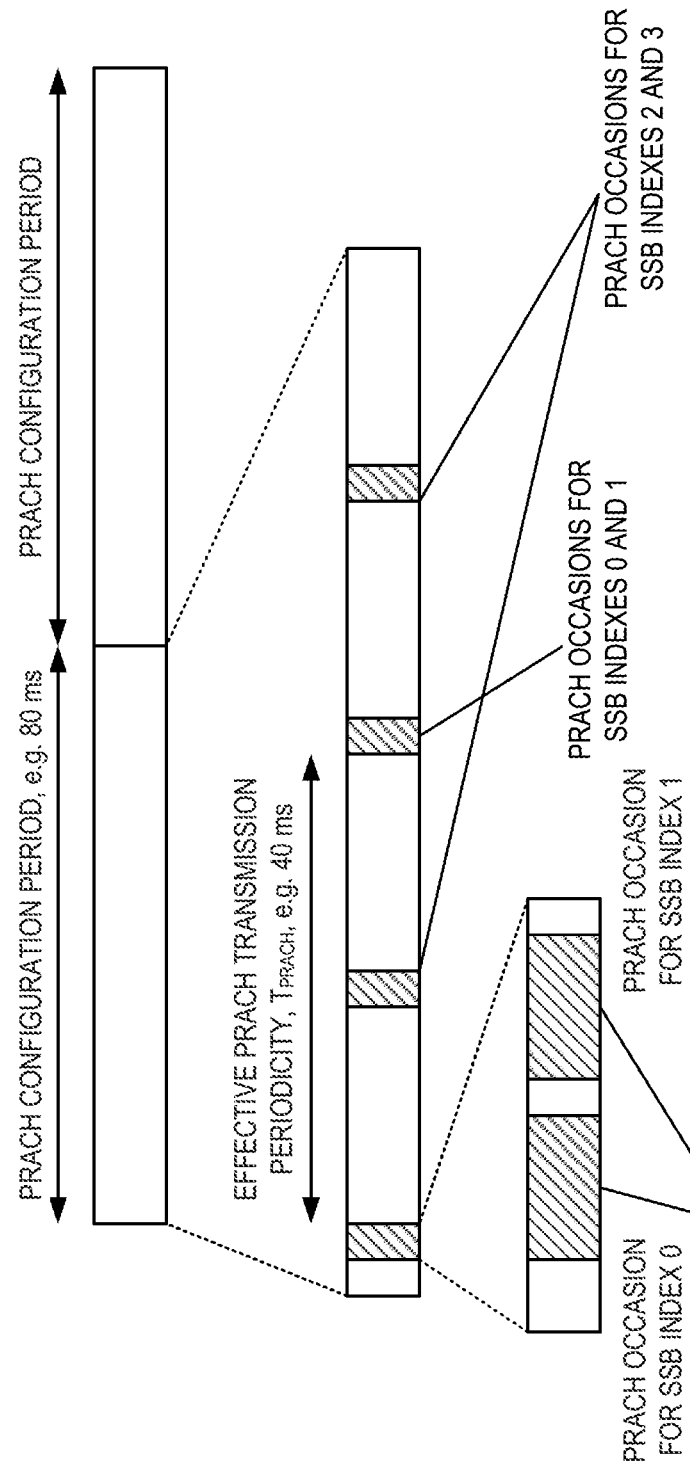

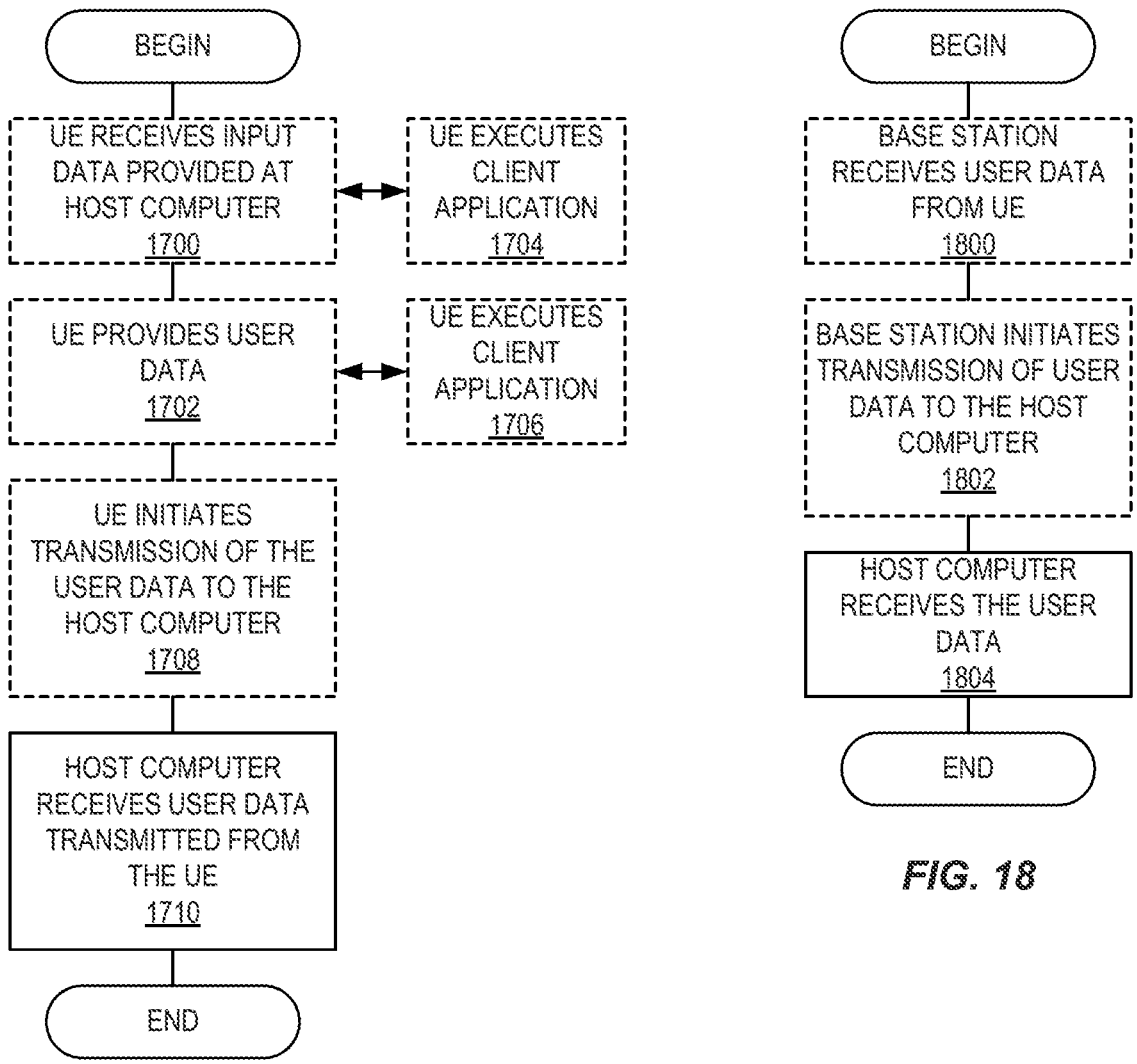

ADAPTING MAXIMUM ALLOWED CCA FAILURES BASED ON SINGLE OCCASION PERIODICITY

RELATED APPLICATIONS

This application is a 371 of International Application No. PCT/IB2020/059273, filed Oct. 2, 2020, which claims the benefit of U.S. Provisional Application No. 62/910,713, filed Oct. 4, 2019, the disclosures of which are fully incorporated herein by reference.

TECHNICAL FIELD

The technology of the disclosure relates generally to adapting maximum allowed Clear Channel Assessment (CCA) failures in a New Radio (NR) in Unlicensed spectrum (NR-U) network.

BACKGROUND

Operation in unlicensed spectrum is inherently different from operation in licensed spectrum. The unlicensed spectrum may be shared by multiple networks, including networks operating according to different standards (e.g., Long Term Evolution-License Assisted Access (LTE-LAA) or Wi-Fi). A device/node must perform a Clear Channel Assessment (CCA) to assess whether a channel in an unlicensed spectrum is busy prior to transmission on the channel. The CCA procedure is also known as Listen-Before-Talk (LBT).

The CCA procedure includes monitoring the channel for a specified time period (also referred to as "sensing time period") and measuring received energy (and/or, in Wi-Fi, checking for preamble transmission indicating the beginning of another device's transmission) during the specified time period. To allow a transmission from a device, the received energy must be below a certain threshold (and/or no Wi-Fi preamble is detected/received above a certain threshold) for the channel to be regarded as clear. The example of energy detection level threshold may be −72 dBm, above which the channel is considered busy and in this case the device (User Equipment (UE) or Base Station (BS)) is required to defer transmission.

After determining that the channel is idle, the device/node is typically allowed to transmit for a certain amount of time, sometimes referred to as the Channel Occupancy Time (COT) or Maximum Channel Occupancy Time (MCOT). The maximum allowed length of the COT depends on regulation and type of CCA (e.g., for how long the medium was sensed) that has been performed, but typically ranges from 1 ms to 10 ms.

FIG. 1 is a diagram providing an exemplary illustration of LTE LBT and COT, wherein "S" represents the sensing time period. As shown in FIG. 1, if the channel is determined to be busy, after some deferral time the UE may try again to sense on the channel in order to determine whether the channel is available. In case the channel is determined to be available, the UE may start transmitting Uplink (UL) burst (during the UE's COT) after a deterministic backoff time. However, the UE may not transmit for longer than the MCOT (e.g., up to 10 ms depending on the region).

Physical Random Access Channel (PRACH) is used to transmit a preamble from UE in order to perform random access procedure in a network. In NR, PRACH transmission occasions are configured by a network parameter called PRACH configuration period and the configurable value may be 10, 20, 40, 80, or 160 (ms). Within each PRACH configuration period, the network may provide a number of PRACH transmission occasions (e.g., slot locations and resource elements) and each PRACH transmission occasion is associated with a Synchronization Signal Block (SSB) index. For example, if a UE receives a SSB index P, the UE needs to transmit a random access preamble on a PRACH transmission occasion corresponding to the SSB index P. It may also be possible to provide more than one of the PRACH transmission occasions in an effective PRACH configuration periodicity ($T_{PRACH}$), which is shorter than a PRACH configuration period.

FIG. 2 is a diagram providing an exemplary illustration of a PRACH configuration period. As shown in FIG. 2, the PRACH configuration period is 80 ms, and 4 SSB indexes are configured. The network configures PRACH occasions every 20 ms and each PRACH occasion support 2 SSB indexes. With this configuration, PRACH occasion for SSB index 0 can be transmitted every 40 ms effectively. Each PRACH occasion is associated with an SSB index (e.g., Synchronization Signal (SS)/Physical Broadcast Channel (PBCH) beam).

SUMMARY

Embodiments disclosed herein include methods performed by a wireless device and a base station for adapting maximum allowed Clear Channel Assessment (CCA) based on operational occasion periodicity. In examples disclosed herein, a wireless device is configured to determine an operational occasion periodicity of a signal that is subject to CCA. Accordingly, the wireless device can determine an association at least between the determined operational occasion periodicity and a maximum number of allowed CCA failures for communicating the signal. The wireless device can then perform one or more operational tasks based on the determined maximum number of allowed CCA failures. By determining the maximum number of allowed CCA failures, the wireless device can obtain information about downlink CCA failures and use the obtained information for adapting measurements procedures in serving cell operational tasks.

In one embodiment, a method performed by a wireless device is provided. The method includes determining an operational occasion periodicity of a signal subjecting to CCA for transmission. The method also includes determining an association at least between the determined operational occasion periodicity and a maximum number of allowed CCA failures for communicating the signal. The method also includes determining the maximum number of allowed CCA failures for the determined operational occasion periodicity based on the determined association between the determined operational occasion periodicity and the maximum number of allowed CCA failures. The method also includes performing one or more operational tasks based on the determined maximum number of allowed CCA failures.

In one embodiment, performing one or more operational tasks comprises communicating the signal with a network node based on the determined maximum number of allowed CCA failures.

In one embodiment, if the maximum number of allowed CCA failures is exceeded, performing one or more of the following tasks comprises restarting an operation associated with communicating the signal, stopping the operation associated with communicating the signal, declaring a Radio Link Failure (RLF), triggering a cell change, triggering measurements on another cell or another carrier, declaring a measurement failure, reporting a measurement with an approximate indication, suspending transmission in uplink, and transmitting in uplink with a transmission timing error larger than a timing error allowed when the maximum number of allowed CCA failures is not exceeded.

In one embodiment, determining the operational occasion periodicity comprises determining the operational occasion periodicity based on at least one of pre-defined configuration information and configuration information received from the network node.

In one embodiment, the network node comprises a serving base station; and determining the operational occasion periodicity comprises determining the operational occasion periodicity based on configuration information received from the network node in a Radio Resource Control (RRC) message or in a System Information (SI) message.

In one embodiment, determining the association at least between the determined operational occasion periodicity and the maximum number of allowed CCA failures comprises determining the association at least between the determined operational occasion periodicity and the maximum number of allowed CCA failures based on a rule.

In one embodiment, the rule is pre-defined.

In one embodiment, the rule is determined by the wireless device based on the configuration information received from the network node.

In one embodiment, determining the association at least between the determined operational occasion periodicity and the maximum number of allowed CCA failures comprises determining the association at least between the determined operational occasion periodicity and the maximum number of allowed CCA failures based on one or more of following parameters: a type of procedure associated with communicating the signal, which includes at least one of a cell change, a cell reselection, a handover, a measurement, and an operation using Discontinuous Transmission (DRX), a direction of the signal communicated with the network node, which includes at least one of an uplink operation and a downlink operation, a type of the signal communicated with the network node, which includes at least one of a Synchronization Signal Block (SSB), a Channel State Information Reference Signal (CSI-RS), a Random Access Channel (RACH) signal, a Sounding Reference Signal (SRS), an SI signal, and a paging signal, a periodic receiver activity pattern or a periodic transmitter activity pattern of the signal communicated with the network node, a measurement pattern, a measurement periodicity, a measurement cycle, and a measurement gap pattern of the signal communicated with the network node, a type of cell of the network node, which includes at least one of a Primary Cell (PCell), a Primary Secondary Cell (PScell), and a Secondary Cell (Scell); and availability of historic data on CCA success and/or failure on a relevant carrier for communicating the RF signal with the network node.

In one embodiment, determining the maximum number of allowed CCA failures for the determined operational occasion periodicity comprises determining the maximum number of allowed CCA failures for the determined operational occasion periodicity based on a predefined table comprising at least one first value of a maximum number of allowed CCA failures corresponding to at least one first value of the operational occasion periodicity, and at least one second value of a maximum number of allowed CCA failures corresponding to at least one second value of the operational occasion periodicity. Wherein the at least one second value of the maximum number of allowed CCA failures is greater than the at least one first value of the maximum number of allowed CCA failures and the at least one second value of the operational occasion periodicity is greater than the at least one first value of the operational occasion periodicity.

In one embodiment, the operational occasion periodicity comprises a Physical Random Access Channel (PRACH) Configuration periodicity, a PRACH periodicity, an SSB based Radio Resource Measurement (RRM) Measurement Timing Configuration (SMTC) periodicity, a DRX periodicity, and a CSI-RS periodicity.

In one embodiment, determining the association at least between the determined operational occasion periodicity and the maximum number of allowed CCA failures for communicating the signal comprises determining an RRC state (RRC_state) of the wireless device configured to communicate the signal based on the determined operational occasion periodicity and determining the association between the determined operational occasion periodicity, the RRC_state, and the maximum allowed CCA failures for communicating the signal.

In one embodiment, determining the association at least between the determined operational occasion periodicity and the maximum number of allowed CCA failures for communicating the signal comprises determining information related to measurement capability of the wireless device and determining the association between the determined operational occasion periodicity, the measurement capability, and the maximum allowed CCA failures for communicating the signal.

In one embodiment, determining the information related to measurement capability of the wireless device comprises determining the information related to measurement capability of the wireless device based on one or more of number of carriers the wireless device is configured to monitor; number of carriers the wireless device is configured to support; and number of neighbor cells the wireless device has identified and is monitoring.

In one embodiment, a wireless device is provided. The wireless device includes processing circuitry. The processing circuitry is configured to determine an operational occasion periodicity of a signal subjecting to CCA for transmission. The processing circuitry is also configured to determine an association at least between the determined operational occasion periodicity and a maximum number of allowed CCA failures for communicating the signal. The processing circuitry is also configured to determine the maximum number of allowed CCA failures for the determined operational occasion periodicity based on the determined association between the determined operational occasion periodicity and the maximum number of allowed CCA failures. The processing circuitry is also configured to perform one or more operational tasks based on the determined maximum number of allowed CCA failures. The wireless device also includes power supply circuitry configured to supply power to the wireless device.

In one embodiment, the processing circuitry is further configured to perform any of the steps performed by the wireless device in any of the previous embodiments.

In one embodiment, a method performed by a base station is provided. The method includes determining an association between an operational occasion periodicity and a maximum number of allowed CCA failures for communicating a signal. The method also includes determining the maximum number of allowed CCA failures for the determined operational occasion periodicity based on the determined association between the determined operational occasion periodicity and the maximum number of allowed CCA failures.

The method also includes configuring a wireless device to perform one or more operational tasks based on the determined association.

In one embodiment, the method also includes sending a message comprising the determined association to the wireless device.

In one embodiment, configuring the wireless device to perform one or more operational tasks comprises configuring the wireless device to communicate the signal based on the determined association.

In one embodiment, a base station is provided. The base station includes a control system. The control system is configured to determine an association between an operational occasion periodicity and a maximum number of allowed CCA failures for communicating a signal. The control system is also configured to determine the maximum number of allowed CCA failures for the determined operational occasion periodicity based on the determined association between the determined operational occasion periodicity and the maximum number of allowed CCA failures. The control system is also configured to configure a wireless device to communicate the signal based on the determined association.

In one embodiment, the control system is further configured to communicate a message comprising the determined association to the wireless device.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 1 is a diagram providing an exemplary illustration of Long-Term Evolution (LTE) Listen-Before-Talk (LBT) and Channel Occupancy Time (COT);

FIG. 2 is a diagram providing an exemplary illustration of a Physical Random Access Channel (PRACH) configuration period;

FIG. 17 is a flowchart illustrating a method implemented in a communication system in accordance with one embodiment; and FIG. 18 is a flowchart illustrating a method implemented in a communication system in accordance with one embodiment.

DETAILED DESCRIPTION

Figure 3:
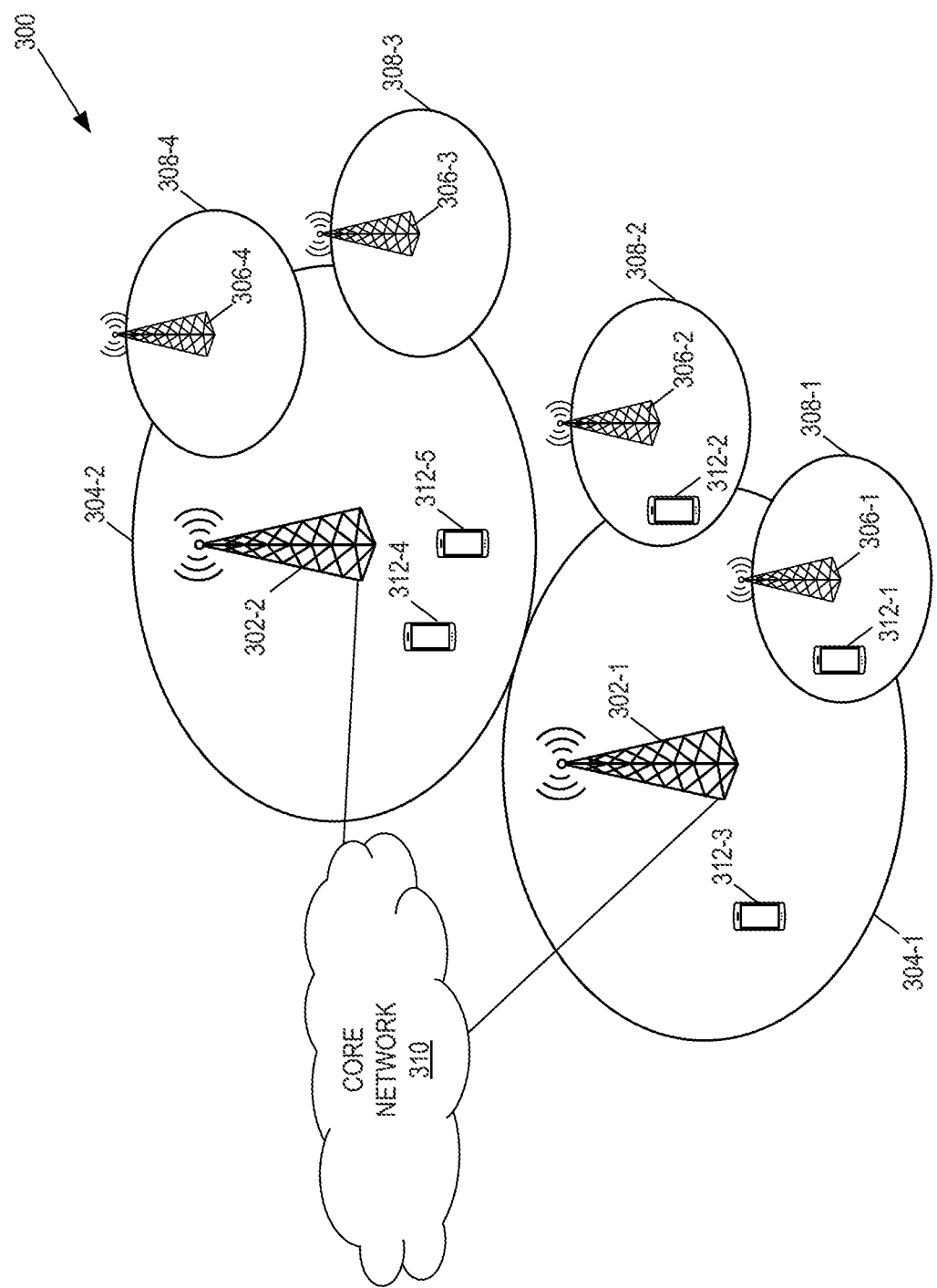
FIG. 3 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). In an NR in Unlicensed Spectrum (NR-U) network, if a total number of CCA failures associated with a UE's attempt to communicate a signal in a cell exceeds a certain threshold (Lmax), then the UE may be required to take certain action(s), such as restart an operation associated with the signal, stop operating that signal, declare Radio Link Failure (RLF), and so on. Each operation may be associated with a different type of signal with configurable parameters (e.g., periodicity). In the existing solution the same value of Lmax is used regardless of the configurable parameters (e.g., periodicity) of the signal used for certain operation. The existing solution is not optimal and leads to performance degradation for certain vital operations (e.g., handover (HO)). Therefore a new solution is required to define Lmax value to ensure optimal performance of the associated operation.

Certain aspects of the present disclosure and their embodiments may provide solutions to the aforementioned or other challenges. Embodiments discussed herein related to methods for adapting a maximum number of allowed CCA failures (Lmax) parameter based on a periodicity of an occasion used by a UE for communicating a signal (e.g., Synchronization Signal Block (SSB) based Radio Resource Measurement (RRM) Measurement Timing Configuration (SMTC) occasion for measurements, PRACH occasion for PRACH transmission, Channel State Information Reference Signal (CSI-RS) or SSB for Radio Link Monitoring (RLM) evaluation or beam management, etc.)

One embodiment relates to a UE configured to communicate a signal that is subject to CCA requirement. Specifically, the UE can be configured to determine a periodicity (Toc) of an operational occasion used for communicating the signal, determine a maximum number of allowed CCA failures (Lmax) based on Toc, and uses the determined parameter Lmax for communicating the signal. For example, if a number of CCA failures (L) for communicating the signal exceeds the Lmax, then the UE may perform one or more operational tasks, such as restart the operation, stop the operation, declare RLF, trigger a cell change, suspend transmission in uplink, trigger measurements on another cell or another carrier (e.g., to find a channel with a higher access probability), declare a measurement failure, report a measurement with an approximate indication, and so on.

In a non-limiting example, an operational occasion may include an occasion, which can be a transmission occasion used by the UE for transmitting a signal (e.g. RACH). A periodicity of the transmission occasion is a periodicity with which the UE can transmit the signal (e.g., RACH) at the transmission occasion (e.g., RACH transmission occasion). The transmission occasion periodicity may be the same or shorter (e.g., more frequent) than an actual UE transmission periodicity. In one specific example, if RACH transmission periodicity ($T_{PRACH}$) is below or equal to certain threshold (H) ($T_{PRACH} \leq H$), then Lmax=L1max. If the RACH transmission periodicity ($T_{PRACH}$) is greater than the threshold (H) ($T_{PRACH} > H$), then Lmax=L2max. Notably, L1max and L2max are related to each by a function (e.g., L1max*L2max). In one specific example, L1max>L2max.

The core essence of the solution is that a UE obtains information about DL CCA failures and use the obtained information for adapting measurements procedures in serving cell operational tasks.

Before discussing specific embodiments of the present disclosure, starting at FIG. 3, a number of terminologies referenced hereinafter are first defined.

Hereinafter, a node may refer to a network node or a UE. Examples of network nodes can include Node B, base station, Multi-Standard Radio (MSR) radio node such as MSR BS, eNB, gNB. MeNB, SeNB, Integrated Access Backhaul (IAB) node, Network Controller, Radio Network Controller (RNC), Base Station Controller (BSC), relay, donor node controlling relay, Base Transceiver Ttation (BTS), central unit (e.g., in a gNB), distributed unit (e.g., in a gNB), baseband unit, Centralized Baseband, C-RAN, Access Point (AP), transmission points, transmission nodes, Remote Radio Unit (RRU), Remote Radio Head (RRH), nodes in a Distributed Antenna System (DAS), core network node (e.g., Mobile Switching Center (MSC), Mobility Management Entity (MME) etc.), Operation and Maintenance (O&M), Operations Support System (OSS), Self-Organizing Network (SON), positioning node (e.g., Evolved Serving Mobile Location Center (E-SMLC)), and so on.

The UE can include any type of wireless device communicating with a network node and/or with another UE in a cellular or mobile communication system. Examples of UE can include target device, Device to Device (D2D) UE, Vehicular to Vehicular (V2V), machine type UE, MTC UE or UE capable of machine to machine (M2M) communication, Personal Digital Assistant (PDA), Tablet, mobile terminals, smart phone, Laptop Embedded Equipment (LEE), Laptop Mounted Equipment (LME), Universal Serial Bus (USB) dongles, and so on.

In some embodiments discussed herein, generic terminology, such as "radio network node" or simply "network node (NW node)", is used. It should be appreciated that the generic terminology can be any kind of network node, including but not limited to base station, radio base station, base transceiver station, base station controller, network controller, evolved Node B (eNB), Node B, gNodeB (gNB), relay node, access point, radio access point, RRU, RRH, central unit (e.g., in a gNB), distributed unit (e.g., in a gNB), baseband unit, centralized baseband, C-RAN, access point (AP), and so on.

The term radio access technology, or RAT, may refer to any RAT, such as UTRA, E-UTRA, Narrow Band Internet of Things (NB-IoT), Wi-Fi, Bluetooth, next generation RAT, New Radio (NR), 4G, 5G, and so on. Notably, any of the equipment denoted as "node," "network node," or "radio network node" may be capable of supporting a single or multiple RATs.

The term "signal" used herein can be any physical signal or physical channel. Examples of physical signals are reference signal such as Primary Synchronization Signal (PSS), Secondary Synchronization Signal (SSS), CSI-RS, Demodulation Reference Signal (DMRS), signals in SSB, Discovery Reference Signal (DRS), Cell Specific Reference Signal (CRS), Positioning Reference Signal (PRS), and so on. The term "physical channel" (e.g., in the context of channel reception) used herein is also called "channel." Examples of physical channels are Physical Broadcasting Channel (PBCH), Narrowband Physical Broadcasting Channel (NPBCH), Physical Downlink Control Channel (PDCCH), Physical Downlink Shared Channel (PDSCH), sPDCCH, sPDSCH, sPUCCH, sPUSCH, Massive Physical Downlink Control Channel (MPDCCH), Narrowband Physical Downlink Control Channel (NPDCCH), Narrowband Physical Downlink Shared Channel (NPDSCH), E-PDCCH, Physical Uplink Shared Channel (PUSCH), Physical Uplink Control Channel (PUCCH), Narrowband Physical Uplink Shared Channel (NPUSCH), channels in CORESET, and so on.

The term "time resource" used herein may correspond to any type of physical resource or radio resource expressed in terms of length of time. Examples of time resources can include symbol, time slot, subframe, radio frame, TTI, interleaving time, slot, sub-slot, mini-slot, and so on.

The term "LBT" used herein may correspond to any type of CSMA procedure or mechanism that is performed by a node on a carrier before transmitting a signal(s) on the carrier. CSMA or LBT may be interchangeably referred to as CCA, clear channel determination, and so on. The transmission of the signal(s) on a carrier subjected to LBT is also referred to as a contention-based transmission. In contrast, the transmission of the signal(s) on a carrier not subjecting to LBT is referred to as a contention free transmission.

The term "CCA" used herein may correspond to any type of Carrier Sense Multiple Access (CSMA) procedure or mechanism to be performed by a node on a carrier before transmitting a signal(s) on that carrier. The CCA is also interchangeably referred to as CSMA scheme, channel assessment scheme, Listen-Before-Talk (LBT), and so on. The CCA based operation is more generally called contention-based operation. The transmission of signals on a carrier subjected to CCA is also called contention-based transmission. The contention-based operation is typically used for transmission on carriers of unlicensed frequency band. But this mechanism may also be applied for operating on carriers belonging to licensed band, for example, to reduce interference. The transmission of the signal(s) on a carrier not subjecting to CCA is also called contention free transmission.

LBT or CCA can be performed, for example, by UE (prior to UL transmission) and/or base station (prior to DL transmission).

UE measurements may be performed by the UE on the serving cell as well as on one or more neighbor cells over some known reference symbols or pilot sequences (e.g., CRS, SSS, PSS, DRS, SSB, CSI-RS, TRS, etc.). The measurements are done on cells on an intra-frequency carrier, inter-frequency carrier(s) as well as on inter-RAT carriers(s) (depending upon the UE capability whether it supports that RAT). The measurements are also done on the carrier frequency (e.g., received power on a carrier, RSSI, etc.). The measurements may be performed for various purposes, for example mobility, positioning, self-organizing network (SON), minimization of drive tests (MDT), operation and maintenance (O&M), network planning and optimization beam management, radio link monitoring, and so on. Examples of measurements may include Cell identification aka PCI acquisition, Reference Symbol Received Power (RSRP), Reference Symbol Received Quality (RSRQ), cell global ID (CGI) acquisition, Reference Signal Time Difference (RSTD), SFN and frame time difference (SFTD), UE RX-TX time difference measurement, Radio Link Monitoring (RLM), which consists of Out of Synchronization (out of sync) detection and In Synchronization (in-sync) detection, L1-RSRP for beam management etc. CSI measurements performed by the UE are used for scheduling, link adaptation etc. by network. Examples of CSI measurements or CSI reports are CQI, PMI, RI, and so on. The measurements may be performed on reference signals such as CRS, CSI-RS, or DMRS. The measurements may be performed with gaps or without gaps (if UE supports this capability).

The term "DRS" is used herein to refer to one or more signals transmitted by a radio network node and used by a UE for performing measurements. DRS may be transmitted periodically with certain periodicity (e.g., 20 ms, 40 ms, 80 ms, 160 ms, etc.) Each DRS occasion, which occurs periodically, contains one or more DRS signals that may include PSS/SSS, PBCH, DMRS, and so on. The UE configuration, which may be referred to as DMTC configuration, may be performed based on information related to DRS on cells of a particular carrier, such as DMTC periodicity, DMTC occasion length in time or duration, and DMTC time offset with respect to reference time (e.g., serving cell's SFN). The DMTC configuration may also be interchangeably referred to as SMTC configuration including such SMTC periodicity as DMTC periodicity, SMTC occasion in time or duration as DMTC occasion or duration, and SMTC time offset as DMTC time offset.

The embodiments are described in the context of NR operation in unlicensed spectrum (NR-U). However, the embodiments discussed herein are not limited to NR-U scenarios. Notably, it may also be possible to apply the embodiments to LTE-LAA/eLAA/feLAA and/or other LTE enhancements for operation in unlicensed band.

An embodiment discussed herein includes a UE configured to communicate a signal between the UE and a first cell (cell1), wherein communication of the signal is subject to CCA. The term communicating the signal is a generic term referring to transmitting the signal (e.g., from the UE to the cell1) and receiving the signal (e.g., from the cell1) or performing a measurement on the signal. Periodic signals may be signals that occur with certain periodicity or based on a periodic pattern. Each periodic occurrence of the signal or the occurrence when the UE can operate the signal is broadly called as an occasion. The occasion is also interchangeably called as signal occasion, signal operational occasion, measurement occasion (e.g., scheduled or configured by means of measurement periodicity or measurement pattern or by UE periodic activity, in one example, measurement occasions at the UE may comprise DL signals further comprised in a subset of DL transmission occasions of a base station), signal operational opportunity, signal duration, operational occasion or simply occasion for operating a signal, etc. In this regard, an occasion can be transmission occasion or a reception occasion (including also a measurement occasion). The transmission occasion may be used by the UE for transmitting signals, channels, or reports (e.g., measurement reports, CSI reports, etc.) to cell1 (e.g., in the UL). The reception occasion may be used by the UE for receiving the signals from cell1 (e.g., in the DL). The periodicity of the operational occasion of the signal is denoted as "Toc." Examples of periodic signals in the UL are (but not limited to) SRS transmission, random access (RA) transmission, etc. RA is also called as PRACH or RACH, etc. The corresponding transmission occasion for SRS transmission is called as SRS transmission occasion or simply SRS occasion, and corresponding transmission occasion for RA transmission is called as RA transmission occasion or simply RA occasion. Examples of periodic signals transmitted by a network node in the DL are (but not limited to) RS, DRS, SSB, CSI-RS, SS, System Information (SI), PBCH, SIB1, paging channel, etc. The corresponding reception occasions for RS, DRS, SS, SI, paging, SSB and CSI-RS are called as RS, DRS, SS, SI, paging, SSB, and CSI-RS reception occasions respectively.

FIG. 3 illustrates one example of a cellular communications system 300 in which embodiments of the present disclosure may be implemented. In the embodiments described herein, the cellular communications system 300 is a 5G system (5GS) including a NR RAN or LTE RAN (i.e., E-UTRA RAN). In this example, the RAN includes base stations 302-1 and 302-2, which in 5G NR are referred to as gNBs (e.g., LTE RAN nodes connected to 5GC, which are referred to as gn-eNBs, controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5GS is referred to as the 5G core (5GC). The base stations 302 (and optionally the low power nodes 306) are connected to the core network 310.

The base stations 302 and the low power nodes 306 provide service to wireless communication devices 312-1 through 312-5 in the corresponding cells 304 and 308. The wireless communication devices 312-1 through 312-5 are generally referred to herein collectively as wireless communication devices 312 and individually as wireless communication device 312. In the following description, the wireless communication devices 312 are oftentimes UEs, but the present disclosure is not limited thereto.

Figure 4:
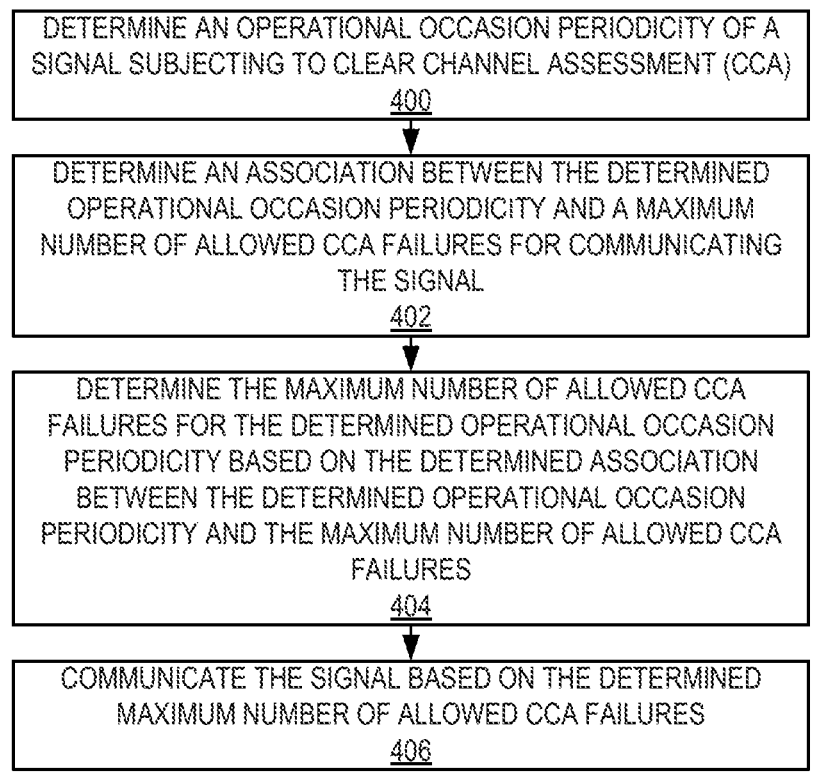
FIG. 4 is a flowchart of an exemplary method performed by a wireless device for adapting maximum allowed Clear Channel Assessment (CCA) based on operational occasion periodicity.

There are, proposed herein, various embodiments which address one or more of the issues disclosed herein. In one embodiment, a method performed by a wireless device for adapting maximum allowed CCA based on operational occasion periodicity is provided. As illustrated in FIG. 4, the method includes determining (400) an operational occasion periodicity of a signal subjecting to CCA for transmission. The method also includes determining (402) an association between the determined operational occasion periodicity and a maximum number of allowed CCA failures for communicating the signal. The method also includes determining (404) the maximum number of allowed CCA failures for the determined operational occasion periodicity based on the determined association between the determined operational occasion periodicity and the maximum number of allowed CCA failures. The method also includes communicating (406) the signal based on the determined maximum number of allowed CCA failures.

Figure 5:
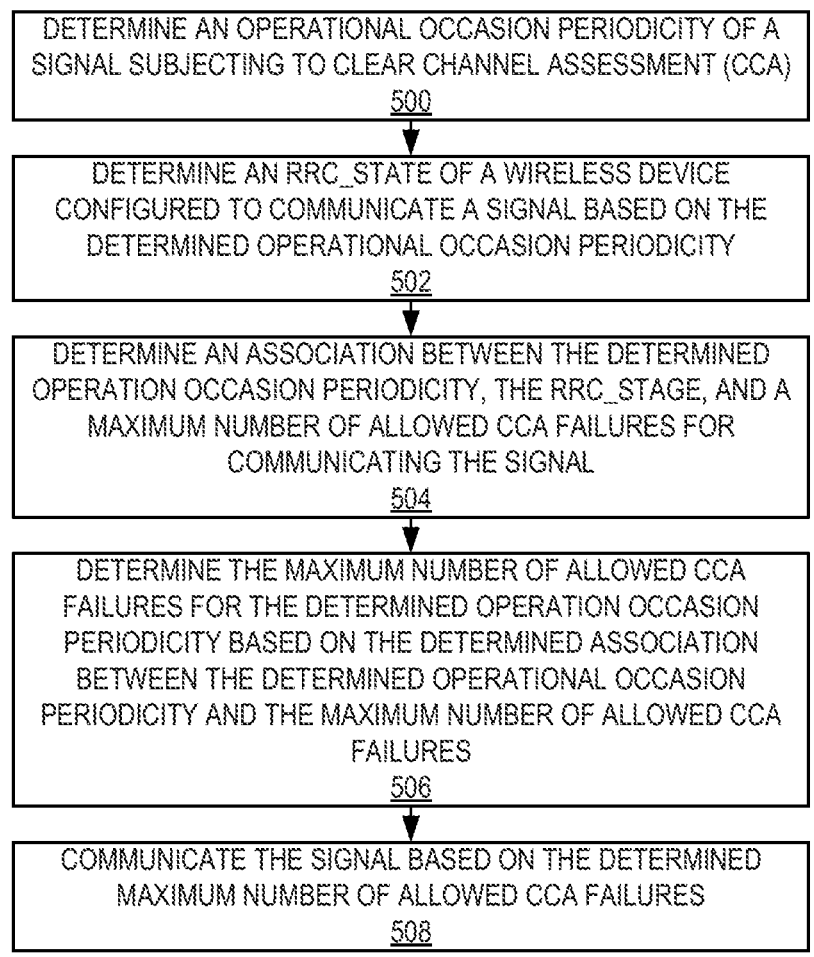
FIG. 5 is a flowchart of another exemplary method performed by a wireless device for adapting maximum allowed CCA based on operational occasion periodicity.

In another embodiment, a method performed by a wireless device for adapting maximum allowed CCA based on operational occasion periodicity is provided. As illustrated in FIG. 5, the method includes determining (500) an operational occasion periodicity of a signal subjecting to CCA for transmission. The method also includes determining (502) an RRC_state of the wireless device configured to communicate a signal based on the determined operational occasion periodicity. The method also includes determining (504) an association between the determined operational occasion periodicity, the RRC_state, and a maximum number of allowed CCA failures for communicating the signal. The method also includes determining (506) the maximum number of allowed CCA failures for the determined operational occasion periodicity based on the determined association between the determined operational occasion periodicity and the maximum number of allowed CCA failures. The method also includes communicating (508) the signal based on the determined maximum number of allowed CCA failures.

Figure 6:
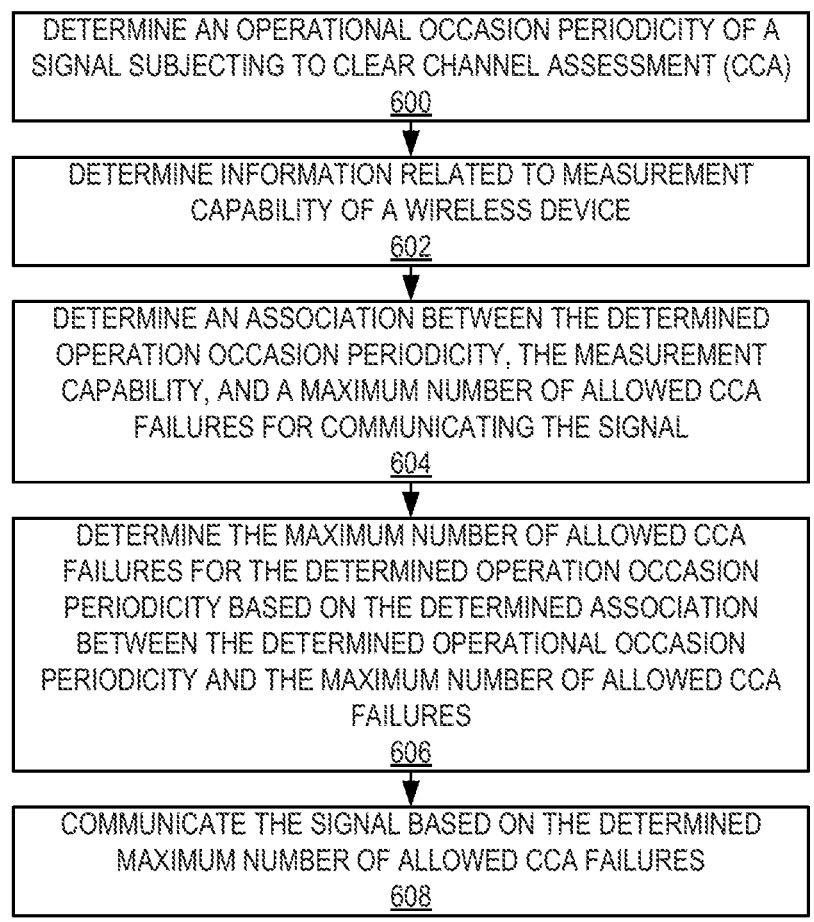
FIG. 6 is a flowchart of another exemplary method performed by a wireless device for adapting maximum allowed CCA based on operational occasion periodicity.

In another embodiment, a method performed by a wireless device for adapting maximum allowed CCA based on operational occasion periodicity is provided. As illustrated in FIG. 6, the method includes determining (600) an operational occasion periodicity of a signal subjecting to CCA for transmission. The method also includes determining (602) information related to measurement capability of the wireless device. The method also includes determining (604) an association between the determined operational occasion periodicity, the measurement capability, and a maximum number of allowed CCA failures for communicating the signal. The method also includes determining (606) the maximum number of allowed CCA failures for the determined operational occasion periodicity based on the determined association between the determined operational occasion periodicity and the maximum number of allowed CCA failures. The method also includes communicating (608) the signal based on the determined maximum number of allowed CCA failures.

Figure 7:
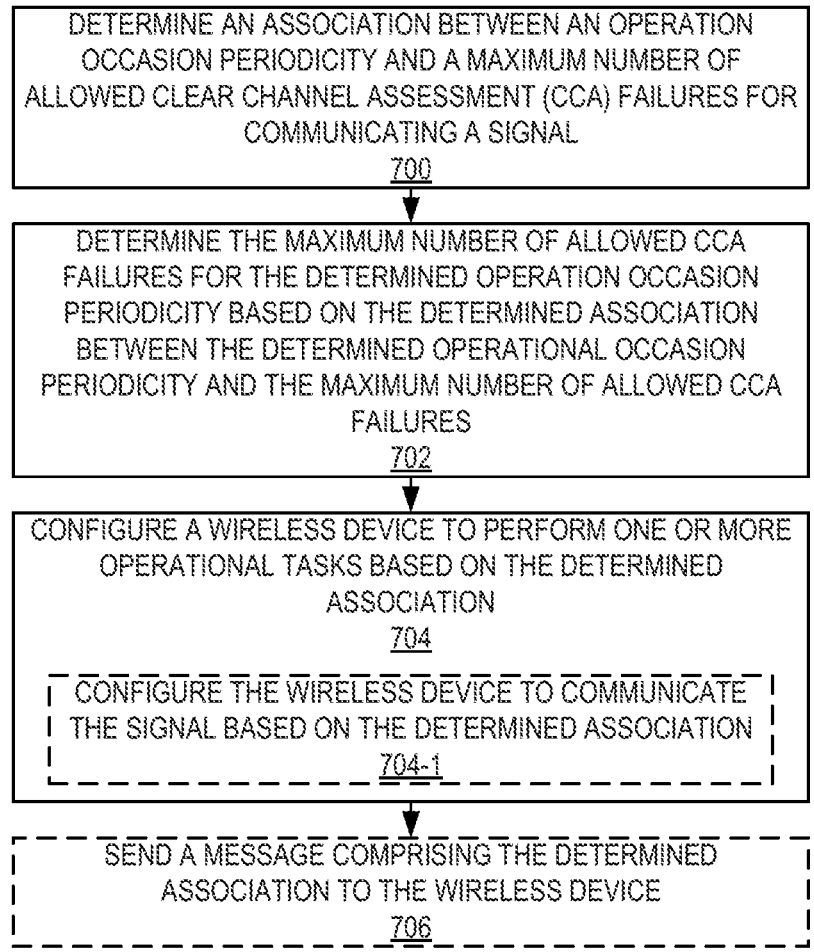
FIG. 7 is a flowchart of an exemplary a method performed by a base station for adapting maximum allowed CCA based on operational occasion periodicity.

In another embodiment, a method performed by a base station for adapting maximum allowed CCA based on operational occasion periodicity is provided. As illustrated in FIG. 7, the method includes determining (700) an association between an operational occasion periodicity and a maximum number of allowed CCA failures for communicating a signal. The method also includes determining (702) the maximum number of allowed CCA failures for the determined operational occasion periodicity based on the determined association between the determined operational occasion periodicity and the maximum number of allowed CCA failures. The method also includes configuring (704) a wireless device to perform one or more operational tasks based on the determined association. For example, the base station can configure (704-1) the wireless device to communicate the signal based on the determined association. The method may also include sending (706) a message comprising the determined association to the wireless device.

Certain embodiments may provide one or more of the following technical advantage(s). Exemplary embodiments discussed herein may be advantageous over the existing solution in the following aspects:
- The UE operation used for communication of a signal that is subject to CCA is enhanced regardless of RACH transmission periodicity ($T_{PRACH}$), with which the UE is configured to communicate the signal.
- The method described herein ensures that the UE does not prematurely terminate or overly delay an operation (e.g., RA transmission) wherein the UE is configured to communicate the signal in accordance to the CCA requirement.
- The performance of operations involving cell change, such as cell reselection, HO, RRC release with redirection, RRC re-establishment etc., is not degraded by RA transmission in accordance to the CCA requirement.

Figure 8:
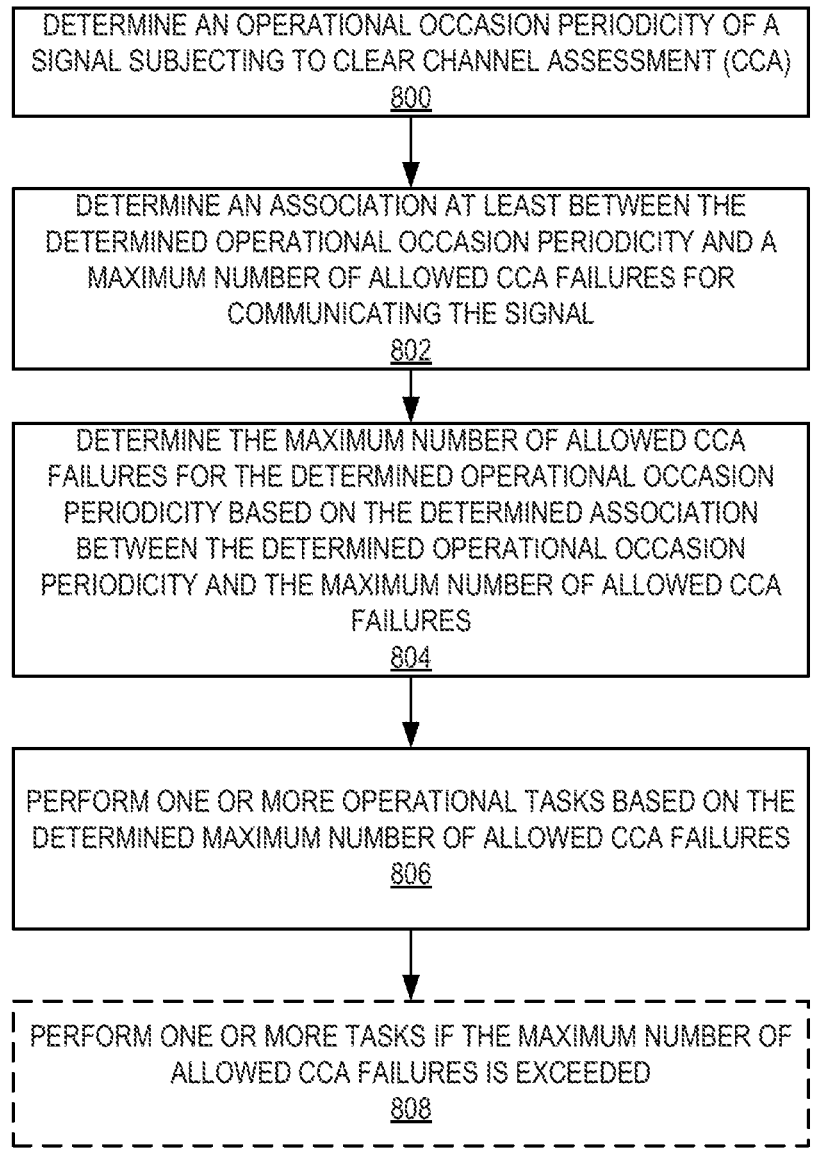
FIG. 8 is a flowchart of another exemplary method performed by a wireless device based on an embodiment of the present disclosure for adapting maximum allowed CCA based on operational occasion periodicity.

FIG. 8 is a flowchart of an exemplary method performed by a wireless device based on an embodiment of the present disclosure for adapting maximum allowed CCA based on operational occasion periodicity. The wireless device is configured to determine an operational occasion periodicity of a signal subjecting to CCA (step 800). The wireless device then determines an association at least between the determined operational occasion periodicity and a maximum number of allowed CCA failures for communicating the signal (step 802).

Figure 8A:
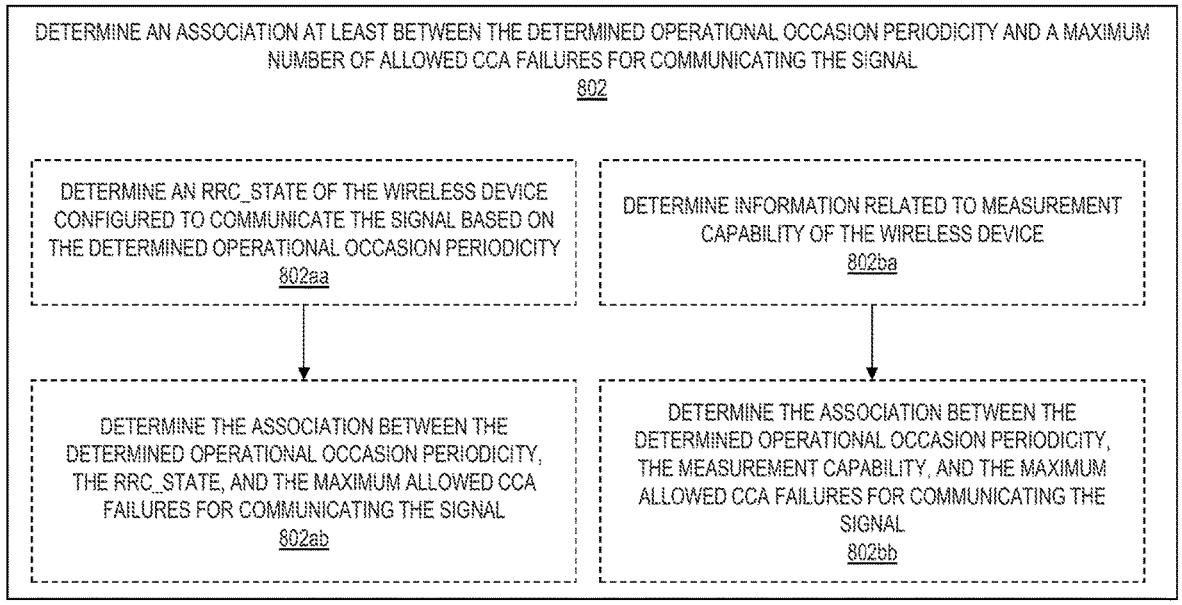
FIGS. 8a-8c are a flowcharts illustrating specific steps in the method of FIG. 8.

In one non-limiting example, as illustrated in FIG. 8a, determining (802) the association at least between the determined operational occasion periodicity and the maximum number of allowed CCA failures can include determining an RRC_STATE of the wireless device configured to communicate the signal based on the determined operational occasion periodicity (step 802aa) and determining the association between the determined operational occasion periodicity, the RRC_STATE, and the maximum allowed CCA failures for communicating the signal (step 802ab). In another non-limiting example, as illustrated in FIG. 8a, determining (802) the association at least between the the determined operational occasion periodicity and the maximum number of allowed CCA failures can include determining information related to measurement capability of the wireless device (step 802ba) and determining the association between the determined operational occasion periodicity, the measurement capability, and the maximum allowed CCA failures for communicating the signal (step 802bb).

Figure 8B:
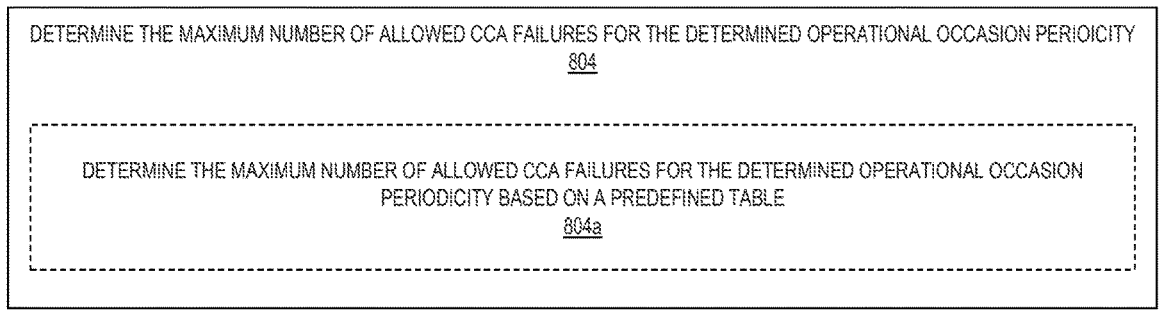

The wireless device then determines the maximum number of allowed CCA failures for the determined operational occasion periodicity based on the determined association between the determined operational occasion periodicity and the maximum number of allowed CCA failures (step 804). In a non-limiting example, as illustrated in FIG. 8b, determining (804) the maximum number of allowed CCA failure for the determined operational occasion periodicity includes determining the maximum number of allowed CCA failures for the determined operational occasion periodicity based on a predefined table (step 804a).

Figure 8C:
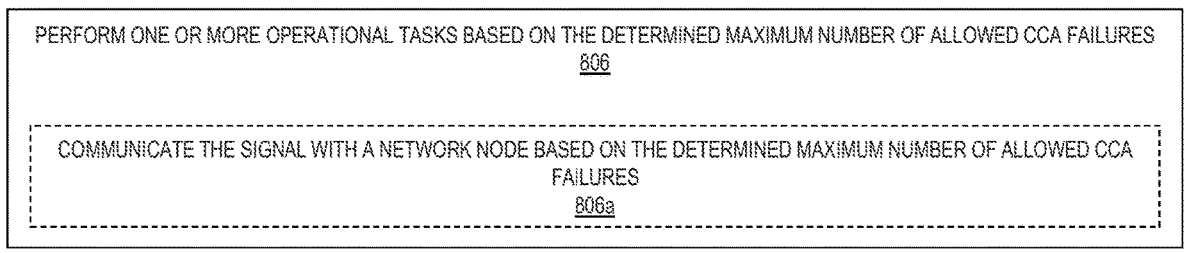

The wireless device can then perform one or more operational tasks based on the determined maximum number of allowed CCA failures (step 806). In a non-limiting example, as illustrated in FIG. 8c, performing (806) one or more operational tasks based on the determined maximum number of allowed CCA failures can include communicating the signal with a network node based on the determined maximum number of allowed CCA failures (step 806a).

The wireless device may be configured to perform one or more tasks if the maximum number of allowed CCA failures is exceeded (step 808).

With reference back to FIG. 4, in one embodiment, the method for adapting maximum allowed CCA failures based on operational occasion periodicity can include the following aspects:

1. Determining by a UE an operational occasion periodicity (Toc) of a signal subjecting to CCA for transmission (step 400). Notably, this step may correspond to step 800 in FIG. 8.
2. Determining by the UE an association (A) between the determined Toc and a maximum number of allowed CCA failures (Lmax) for communicating the signal (step 402)
   when the UE determines the association based on a message from a network node, the network node may determine the association (e.g., based on the same or similar rules as described herein) and then configure the UE with the association accordingly. Notably, this step may correspond to step 802 in FIG. 8.
3. Determining by the UE the Lmax corresponding to the determined Toc based on the determined association (A) (step 404)
   when the UE determines the Lmax based on a message from a network node, the network node may determine Lmax or a parameter determining the Lmax (e.g., based on the same or similar rules as described herein) and then configure the UE accordingly. Notably, this step may correspond to step 804 in FIG. 8.
4. Communicating the signal based on the determined Lmax (step 406). Notably, this step may correspond to step 806a in FIG. 8c. For example, if a number of CCA failures (L) for communicating the signal exceed the determined Lmax, the UE may perform one or more operational tasks accordingly. The operational tasks may include restarting the operation, stopping the operation, suspending transmission in uplink, transmitting in uplink with a transmission timing error larger than the timing error allowed when L≤Lmax, declaring RLF, triggering a cell change, triggering measurements on another cell or another carrier (e.g., to find a channel with a higher access probability), and so on.

The UE determines the information about the operational occasion periodicity (Toc) based on pre-defined configuration information and/or by receiving configuration information from a network node (e.g., from the serving base station in an RRC message in dedicated channel or in system information). The configuration information may include at least the operational occasion periodicity (Toc), but may also include additional information such as the time duration of each operational occasion, reference time for starting or terminating each operational occasion, and so on. The operational occasion periodicity (Toc) may depend on a configuration(s) in one or more cells.

The UE further determines the association (A) between the determined Toc and the maximum number of allowed CCA failures (Lmax) for communicating the signal based on a rule. The rule can be pre-defined and/or determined by the UE by receiving configuration information from a network node (e.g., from the serving base station in an RRC message in dedicated channel or in system information). For examples the values of Lmax (or different values of Lmax associated with the Toc) can be pre-defined or configured by the network node. In a non-limiting example, the association (A) can depend on one or more of the following parameters:
- a type of the procedure (e.g., cell change, cell reselection, handover, measurements, operation with DRX, etc.)
- direction of operation (e.g., UL or DL)
- type of signal used for the operation (e.g., SSB, CSI-RS, RACH, SRS, SI, paging, etc.)
- periodic receiver or transmitter activity pattern (e.g., when a UE is configured with DRX cycles of a certain length)
- measurement pattern or periodicity or measurement cycle, measurement gap pattern
- type of the cell (e.g., PCell, or PScell, or Scell)
- availability of historic data regarding CCA success (and failure) on the relevant carrier A general example of a rule for associating Toc and Lmax for any periodic operational occasion is shown in Table 1 below. In this example, for each Toc value there is one associated value of Lmax (e.g., Lmax=L1max for Toc1, and so on). In this example the values of L1max, L2max . . . , and Lkmax are different. In one specific example L1max>L2max> . . . >Lkmax.

TABLE 1

A general example of a relation between an operational occasion periodicity and the maximum number of allowed CCA failures

| Configuration | Operational occasion periodicity (Toc) | Max number of allowed CCA failures (Lmax) |
|---|---|---|
| 1 | Toc1 | L1max |
| 2 | Toc2 | L2max |
| . . . | . . . | . . . |
| K | Tock; Tock > . . . > Toc2 > Toc1 | Lkmax |

Another general example of a rule associating Toc and Lmax for any periodic operational occasion is shown in Table 2. In this example, for each set or group of Toc values there is one associated value of Lmax. For example, when Toc is less than or equal to certain threshold (H) then Lmax=L1max. In contrast, when Toc>H then Lmax=L2max. This example can be generalized for any number of groups of Toc value and any number of corresponding thresholds. The parameters L1max and L2max are related to each other by a function (e.g., L1max*L2max). In one specific example L1max>L2max.

TABLE 2

A general example of a relation between an operational occasion periodicity and the maximum number of allowed CCA failures assuming one threshold (H)

| Configuration | Operational occasion periodicity (Toc) | Max number of allowed CCA failures (Lmax) |
|---|---|---|
| 1 | Toc < H | L1max |
| 2 | Toc ≥ H | L2max |

A specific example of a rule associating periodicity (Toc) of the PRACH configuration period and Lmax when the operational occasion is a PRACH Configuration Period ($T_{PRACH-conf}$) is shown in Table 3. In this example, for each $T_{PRACH-conf}$ value, there is one associated value of Lmax (e.g., Lmax=L1max for $T_{PRACH-conf}$=10 ms, Lmax=L2max for $T_{PRACH-conf}$=20, and so on). In a non-limiting example, L1max=10; L2max=8; L3max=6; L4max=4; L5max=2.

TABLE 3

A specific example of a relation between a RACH configuration period and the maximum number of allowed CCA failures

| Configuration | PRACH configuration period ($T_{PRACH-conf}$) | Max number of allowed CCA failures (Lmax) |
|---|---|---|
| 1 | 10 ms | L1max |
| 2 | 20 ms | L2max |
| 3 | 40 ms | L3max |
| 4 | 80 ms | L4max |
| 5 | 160 ms | L5max |

Another example is shown in Table 4. In this example, when $T_{PRACH-conf}$ is less than or equal to certain threshold (e.g. H=40 ms) then Lmax=L1max. In contrast, when $T_{PRACH-conf}$>H then Lmax=L2max. This example is provided for two groups of $T_{PRACH-conf}$ and one threshold (e.g., H=40 ms). However, it can be generalized for more than one group of $T_{PRACH-conf}$ values and corresponding thresholds. An example in FIG. 2 also illustrates the adaptation of Lmax based on the PRACH transmission occasion periodicity. In this particular example, L1max>L2max. In one non-limiting example, L1max=4 and L2max=2. In another non-limiting example, L1max=8 and L2max=4.

TABLE 4

A specific example of a relation between a RACH configuration period and the maximum number of allowed CCA failures

| Configuration | PRACH configuration period ($T_{PRACH-conf}$) | Max number of allowed CCA failures (Lmax) |
|---|---|---|
| 1 | $T_{PRACH-conf}$ ≤ 40 ms | L1max |
| 2 | $T_{PRACH-conf}$ > 40 ms | L2max |

Figure 9:
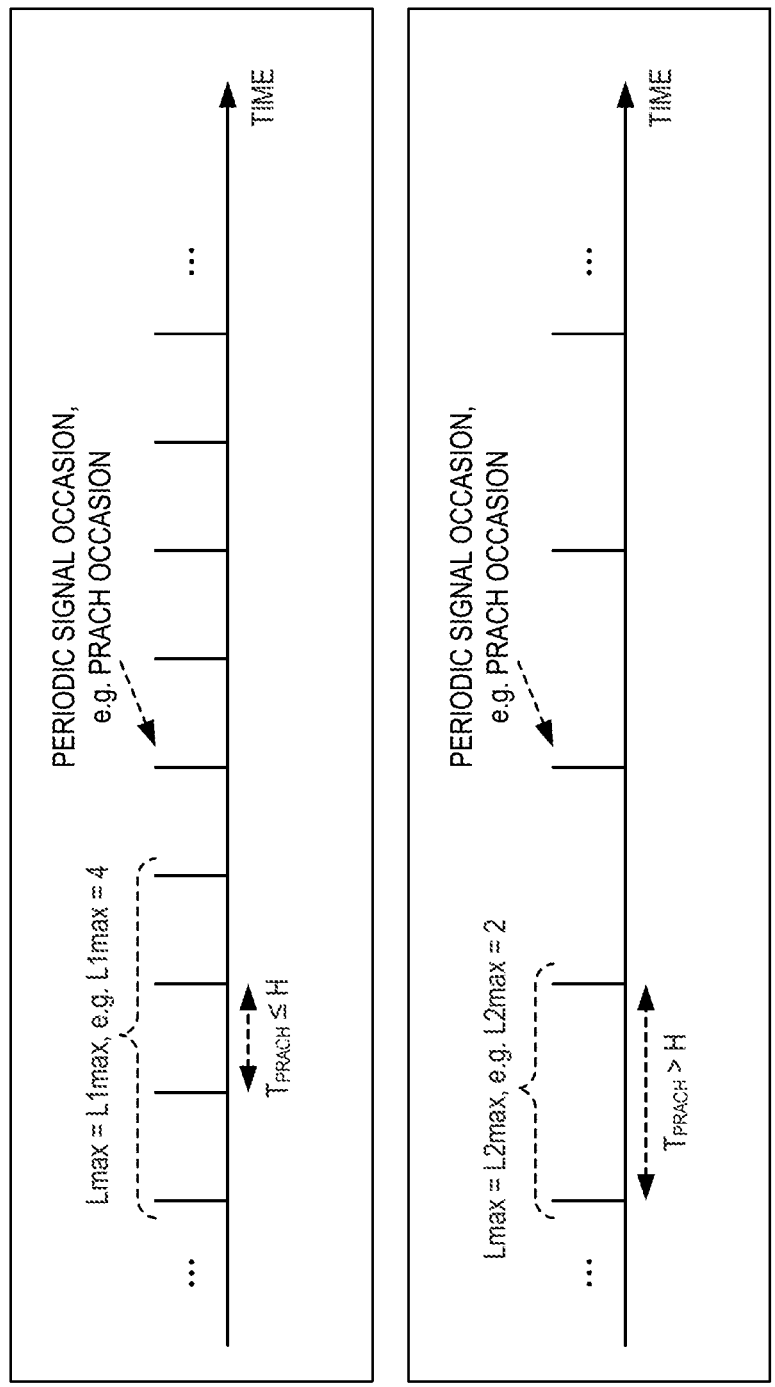
FIG. 9 is a diagram providing an exemplary illustration of adaptation of the maximum number of allowed CCA failure based on PRACH transmission occasion periodicity.

Another specific example of a rule associating periodicity (TOC) of the PRACH occasion periodicity ($T_{PRACH}$) and Lmax when the operational occasion is a PRACH occasion is shown in Table 5. In this example, when $T_{PRACH}$ is less than or equal to certain threshold (H=40 ms) then Lmax=L1max. In contrast, when $T_{PRACH}$>H then Lmax=L2max. This example is provided for two groups of $T_{PRACH}$ and one threshold (e.g. H=40 ms). However, it can be generalized for more than one group of $T_{PRACH}$ values and corresponding thresholds. An example in FIG. 9 also illustrates the adaptation of Lmax based on the PRACH transmission occasion periodicity. In this particular example, L1max>L2max. In a non-limiting example, L1max=4 and L2max=2. In another non-limiting example, L1max=8 and L2max=4.

TABLE 5

A specific example of a relation between a RACH transmission occasion periodicity and the maximum number of allowed CCA failures

| Configuration | PRACH occasion periodicity ($T_{PRACH}$) | Max number of allowed CCA failures (Lmax) |
|---|---|---|
| 1 | $T_{PRACH} \leq 40$ ms | L1max |
| 2 | $T_{PRACH} > 40$ ms | L2max |

Another specific example of a rule associating periodicity ($T_{SMTC}$) of the SMTC occasion or measurement occasion more generally and Lmax when the operational occasion is a SMTC occasion/measurement occasion is shown in Table 6. In this example, the CCA failure (or success) is performed at the BS (e.g., cell1), thus the Lmax is reported to the UE via any of the network signaling (e.g., the network node may determine Lmax or a parameter determining the Lmax, and then configure the UE accordingly). As an example embodiment, when $T_{SMTC}$ is less than or equal to certain threshold (e.g. H=40 ms) then Lmax=M1max. In contrast, when $T_{SMTC}$>H then Lmax=M2max. This example is provided for two groups of $T_{SMTC}$ and one threshold (e.g., H=40 ms). But it can be generalized for more than one group of $T_{SMTC}$ values and corresponding thresholds. In a non-limiting example, M1max=8 and M2max=4.

TABLE 6

A specific example of a relation between a SMTC occasion periodicity and the maximum number of allowed CCA failures

| Configuration | SMTC occasion periodicity ($T_{SMTC}$) | Max number of allowed CCA failures (Lmax) |
|---|---|---|
| 1 | $T_{SMTC} \leq 40$ ms | M1max |
| 2 | $T_{SMTC} > 40$ ms | M2max |

Another specific example of a rule associating Discontinuous Reception (DRX) cycle or DRX periodicity ($T_{DRX}$) and Lmax when the operational occasion is measurement occasion once every DRX cycle is shown in Table 7. In this example, the CCA failure (or success) is performed by the BS (e.g. cell1), thus the Lmax is reported to the UE via any of the network signaling (e.g., the network node may determine Lmax or a parameter determining the Lmax, and then configure the UE accordingly). As an example, when $T_{DRX}$ is less than or equal to certain threshold (e.g. H=320 ms) then Lmax=N1max. In contrast, when $T_DR$>H then Lmax=N2max. This example is provided for two groups of $T_{DRX}$ and one threshold (e.g., H=320 ms). But it can be generalized for more than one group of TDRX values and corresponding thresholds. In a non-limiting example, N1max=10 and N2max=6.

TABLE 7

A specific example of a relation between a DRX periodicity and the maximum number of allowed CCA failures

| Configuration | DRX periodicity ($T_{DRX}$) | Max number of allowed CCA failures (Lmax) |
|---|---|---|
| 1 | $T_{DRX} \leq 320$ ms | N1max |
| 2 | $T_{DRX} > 320$ ms | N2max |

In another specific example of a rule associating DRX cycle or DRX periodicity and Lmax, $T_{DRX}$ may be a function of corresponding parameters from at least two cells (e.g., $T_{DRX}$=max(TDRX_Cell1, TDRX_Cell2)). Lmax may be determined as described above.

Another example of a rule associating Measurement Gap Periodicity (MGRP) and Lmax when the operational occasion is a measurement occasion once every measurement gap. Specifically, when MGRP is below a threshold, a first value of Lmax can be configured. In contrast, when MGRP is above a threshold, a second value of Lmax can be configured (e.g., the second value can be smaller than the first value).

In another example of a rule associating a function F of any one or more parameters configuring operational occasion, such as any parameters such as described above (e.g., MGRP, DRX cycle length, SSB or SMTC periodicity, etc.) and Lmax. When F is below a threshold, a first value of Lmax is configured. In contrast, when F is above a threshold, a second value of Lmax is configured. In one example, F=max(MGRP, SMTC period, DRX cycle)×K, wherein K is a scaling factor which can be, for example, equal to 1 (a special case, no scaling) or CSSF defined in TS 38.133 (v15.8.0).

Another specific example of a rule associating periodicity ($T_{CSI-RS}$) of the CSI-RS occasion or measurement occasion more generally and Lmax when the operational occasion is a CSI-RS occasion/measurement occasion is shown in Table 8. In this example when $T_{CSI-RS}$ is less than or equal to certain threshold (e.g., H=40 slots) then Lmax=M1max. In contrast, when $T_{CSI-RS}$>H then Lmax=M2max. This example is provided for two groups of $T_{CSI-RS}$ and one threshold (e.g., H=40 slots). But it can be generalized for more than one group of $T_{CSI-RS}$ values and corresponding thresholds. In a non-limiting example, M1max=8 and M2max=4.

TABLE 8

A specific example of a relation between a CSI-RS occasion periodicity and the maximum number of allowed CCA failures

| Configuration | CSI-RS occasion periodicity ($T_{CSI-RS}$) | Max number of allowed CCA failures (Lmax) |
|---|---|---|
| 1 | $T_{CSI-RS} \leq 40$ slots | M1max |
| 2 | $T_{CSI-RS} > 40$ slots | M2max |

In another specific example, the UE may determine the association (A) and Lmax based on the type of the cell. For example, for PCell or PSCell or Scell, the UE can use different Lmax. This is described in Table 9 below. After determining the association between Toc and Lmax, the UE determines the value of Lmax.

TABLE 9

A specific example of a relation between a cell type
and the maximum number of allowed CCA failures

| Configuration | Cell type | Max number of allowed CCA failures (Lmax) |
|---|---|---|
| 1 | PCell | C1max |
| 2 | PSCell | C2max |
| 3 | SCell | C3max |

In one specific example, a rule, where UE uses DL RS for operation and is also configured with DRX, can include the following aspects:

I. If the DL RS periodicity (e.g., SSB periodicity, CSI-RS periodicity, etc.) is equal to or below a RS threshold (H1) and the DRX cycle is equal to or below certain DRX threshold (H2), then Lmax=L1max II. If RS periodicity>H1 and DRX cycle≤H2, then Lmax=L2max III. If (DRX cycle>H2), then Lmax=L3max (L1max>L2max>L3max) regardless of relation between RS periodicity The UE may further use the determined value of Lmax for communicating the signal at the operational occasion that occurs once every Toc. For example, if the actual number of CCA failures (L) determined by the UE exceeds Lmax then the UE performs or executes one or more operational tasks. The UE may determine that CCA has failed (or CCA failure has occurred) in the uplink if the UE is unable to transmit a signal due to CCA failure in the uplink. The UE may determine that CCA has failed in the downlink (e.g. in the base station transmitting the signal) if the UE is unable to receive a signal or if the signal is unavailable at the UE or the UE determined that the signal is not present or cannot detect the signal. For example, the UE may detect that the DL signal is unavailable at the UE based on autonomous determination (e.g., checking the absence of signal by correlating with pre-defined sequences) and/or by receiving an indication from a network node (e.g., from a cell in licensed carrier). The actual number of CCA failures, L, may correspond to consecutive number of CCA failures or to number of CCA failures over certain period of time (e.g., measurement period, cell search period, evaluation period etc.). Examples of such tasks include:

stopping the operation in cell1 restarting the operation immediately or after a certain period of time. Notably, the number of restarting attempts may be limited or unlimited. If the number of restarting attempts is limited, then another task may be performed upon reaching the maximum number of restarting attempts.

declaring RLF initiating a cell or carrier change initiating measurements on another cell or another carrier (e.g., to find a channel with a higher access probability)

performing the operation on another cell (e.g., on a second cell (cell2) if cell2 is available performing the operation on another cell or carrier which is not subject to CCA or has a less occupied channel (e.g., on a third cell (cell3) if cell3 is available initiating new carrier BW for a carrier where CCA is required, for example, when CCA fails on a carrier with X Hz, the transmitter may resort to a carrier BW of Y Hz, where X>Y suspending transmission of any signal in uplink transmitting a signal in uplink but with transmission timing error (Te2) (error with respect to reference value) larger than transmission timing error (te1) with which the UE transmits the signal in uplink when L≤Lmax For example, if the PRACH periodicity is 80 ms then based on the rules expressed in examples Table 4 and FIG. 2, the UE determines Lmax=L2max=2. The UE then uses this value of Lmax=2 for a procedure associated with PRACH transmission in cell1. For example if the UE experiences more than consecutive 2 CCA failures or 2 CCA failures over certain period of time (TO), then the UE performs one or more operational tasks. Examples of such tasks include stopping the transmission of PRACH in cell1, restarting the PRACH transmission immediately or after certain period of time, transmitting PRACH on another cell (e.g., on a second cell (cell2) if cell2 is available, transmitting PRACH on a cell not subject to CCA (e.g., on a third cell (cell2) if cell3 is available.

With reference back to FIG. 5, the UE may be configured to determine an operational occasion periodicity (Toc) of a signal, whose transmission is subject to CCA, as described above (step 500).

The UE may also be configured to determine the RRC_state of the UE where the UE is expected to perform the operation associated with Toc (step 502). Notably, this step may correspond to step 802aa in FIG. 8a. In this step, the UE determines whether the operational occasion associated with Toc is expected to take place in, for example, RRC_IDLE state, RRC_INACTIVE state or RRC_CONNECTED state. The RRC_state is expected to be known to the UE that performs different operational tasks in different RRC_states, and to fulfill different UE requirements in different RRC_states. In this regard, it may be assumed that RRC_state information where UE is expected to perform operation associated with Toc is known to the UE.

The UE may also be configured to determine an association between the determined Toc, RRC_state where operation is expected to take place and a maximum number of allowed CCA failures (Lmax) for operating the signal (step 504). Notably, this step may correspond to step 802ab in FIG. 8a. Since UE requirements and UE behavior (e.g., activity) are typically different in different RRC states, it may be assumed that the Lmax depends on both Loc and RRC_states. When the UE is in less active states (such as IDLE/INACTIVE), the UE may continue to stay active (DRX ON) instead of going to sleep (DRX OFF) mode and try again in the next transmission opportunity even if the UE misses one transmission opportunity. This may not always be possible for a UE operating in CONNECTED mode because in CONNECTED mode the UE will be operating different tasks and operations that are more time critical. Thus, Lmax can be larger in RRC_IDLE/INACTIVE states than in RRC_CONNECTED state. An example is shown in Table 10 under an assumption that L1max>L2max and L3max>L4max.

TABLE 10

A general example of a relation between an operational occasion periodicity, RRC state and the maximum number of allowed CCA failures assuming one threshold (H)

| Configuration | Operational occasion periodicity (Toc) | RRC state | Max number of allowed CCA failures (Lmax) |
| --- | --- | --- | --- |
| 1 | Toc < H | RRC_IDLE or RRC_INACTIVE | L1max |
| 2 | Toc < H | RRC_CONNECTED | L2max |
| 3 | Toc ≥ H | RRC_IDLE or RRC_INACTIVE | L3max |
| 4 | Toc ≥ H | RRC_CONNECTED | L4max |

The UE may also be configured to determine the value of Lmax for the determined Toc based on the association, as described above (step 506). The UE may be further configured to communicate the signal based on the determined value of Lmax (step 508). Notably, this step may correspond to step 808 in FIG. 8. For example, if a number of CCA failures (L) for operating the signal exceeds Lmax then the UE performs one or more operational tasks (e.g., restart the operation, stop the operation, etc.)

With reference back to FIG. 6, the UE may be configured to determine an operational occasion periodicity (Toc) of a signal, whose transmission is subject to CCA (step 600).

The UE may also be configured to determine information about UE measurement capability (step 602). Notably, this step may correspond to step 802ba in FIG. 8a. In this step, the UE obtains information related to its measurement capability which is denoted as N. In a non-limiting example, N includes at least one of the following:

Number of carriers UE is monitoring, number of carriers UE has been configured to monitor, the number of carriers it supports Number of cells it has identified, e.g. the number of neighbor cells it has identified and monitoring (e.g., by performing measurements on them).

The UE may also be configured to determine an association between the determined Toc, N, and a maximum number of allowed CCA failures (Lmax) for operating the signal (step 604). Notably, this step may correspond to step 802bb in FIG. 8a. It may be assumed that Lmax is related to both Toc and measurement capability N. Since the UE may perform different actions upon the number of CCA failures exceeds Lmax, the value of Lmax can be adapted to N. For example, if there is a risk that UE may end up with connection failure or be out of coverage in case the UE fails operating Toc while maintaining Lmax, then Lmax can be set to a larger value when the UE is monitoring fewer carriers or when the UE has identified fewer neighbor cells. This may reduce the risk of the UE losing the connection or being out of coverage. In contrast, if the UE is monitoring many carriers and/or has identified many neighbor cells, then Lmax can be set to a smaller value compared to previous case. The principle is generalized in Table 11 under an assumption that L1max>L2max and L4Max<L3max.

TABLE 11

A general example of a relation between an operational occasion periodicity, RRC state and the maximum number of allowed CCA failures assuming one threshold (H)

| Configuration | Operational occasion periodicity (Toc) | UE measurement capability (N) | Max number of allowed CCA failures (Lmax) |
| --- | --- | --- | --- |
| 1 | Toc < H | N < L | L1max |
| 2 | Toc < H | N ≥ L | L2max |
| 3 | Toc ≥ H | N < L | L3max |
| 4 | Toc ≥ H | N ≥ L | L4max |

The UE may also be configured to determine the value of Lmax for the determined Toc based on the association, as described above (step 606). The UE may be further configured to communicate the signal based on the determined value of Lmax (608). For example if a number of CCA failures (L) for operating the signal exceeds Lmax then the UE performs one or more operational tasks (e.g., restart the operation, stop the operation, etc.).

Figure 10:
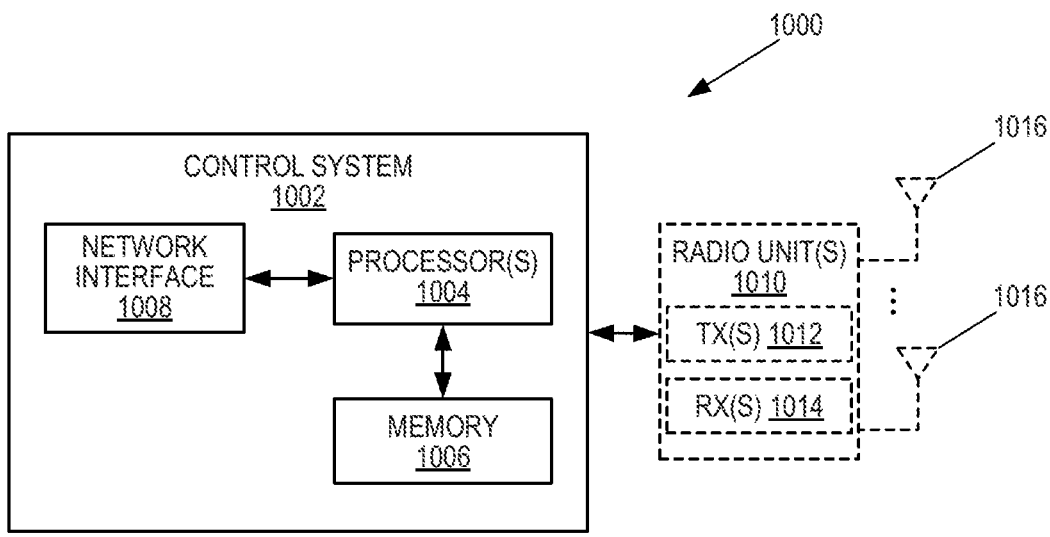
FIG. 10 is a schematic block diagram of a radio access node according to some embodiments of the present disclosure.

FIG. 10 is a schematic block diagram of a radio access node 1000 according to some embodiments of the present disclosure. Optional features are represented by dashed boxes. The radio access node 1000 may be, for example, a base station 802 or 806 or a network node that implements all or part of the functionality of the base station 802 or gNB described herein. As illustrated, the radio access node 1000 includes a control system 1002 that includes one or more processors 1004 (e.g., Central Processing Units (CPUs), Application Specific Integrated Circuits (ASICs), Field Programmable Gate Arrays (FPGAs), and/or the like), memory 1006, and a network interface 1008. The one or more processors 1004 are also referred to herein as processing circuitry. In addition, the radio access node 1000 may include one or more radio units 1010 that each includes one or more transmitters 1012 and one or more receivers 1014 coupled to one or more antennas 1016. The radio units 1010 may be referred to or be part of radio interface circuitry. In some embodiments, the radio unit(s) 1010 is external to the control system 1002 and connected to the control system 1002 via, e.g., a wired connection (e.g., an optical cable). However, in some other embodiments, the radio unit(s) 1010 and potentially the antenna(s) 1016 are integrated together with the control system 1002. The one or more processors 1004 operate to provide one or more functions of a radio access node 1000 as described herein. In some embodiments, the function(s) are implemented in software that is stored, e.g., in the memory 1006 and executed by the one or more processors 1004.

Figure 11:
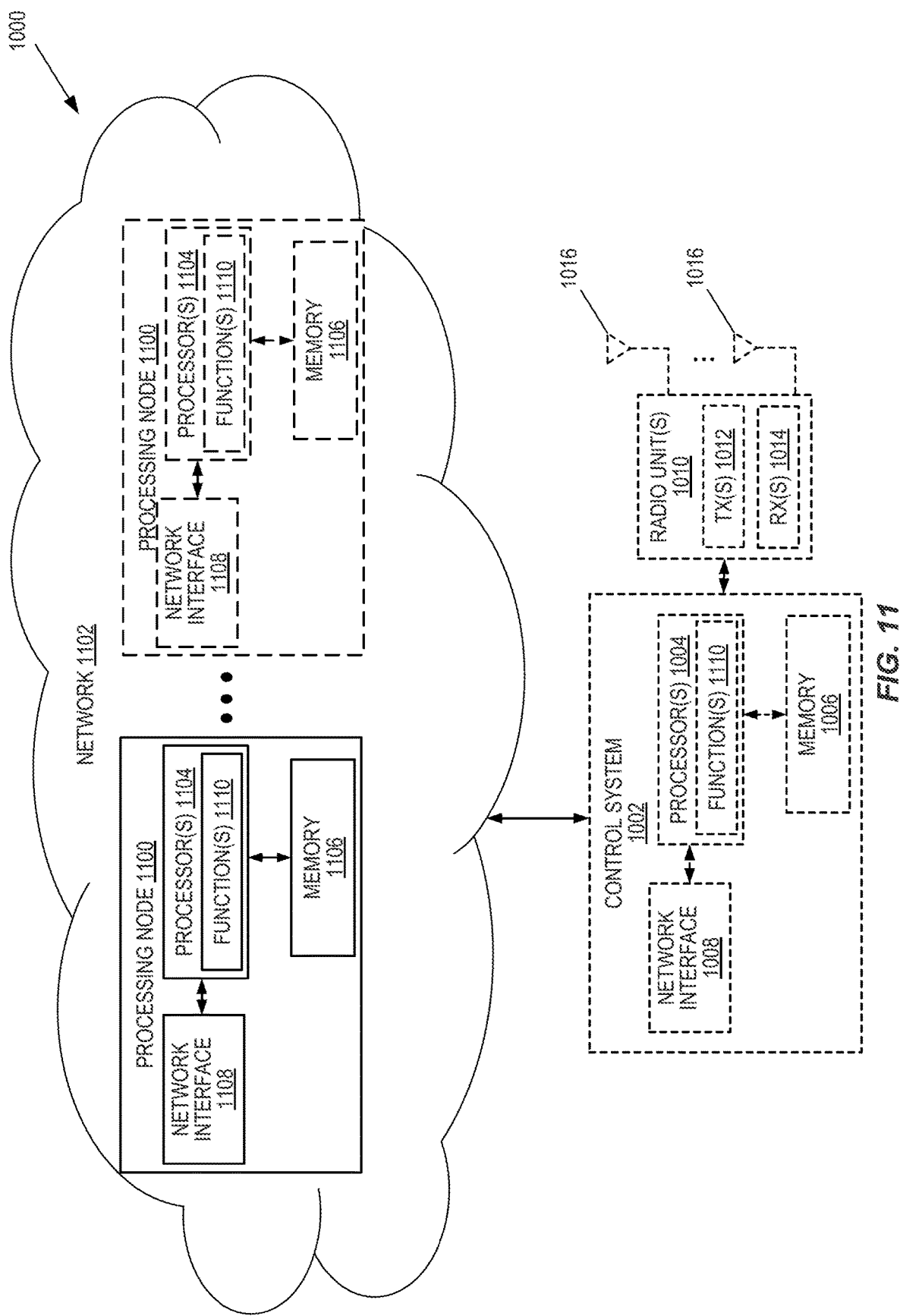
FIG. 11 is a schematic block diagram that illustrates a virtualized embodiment of the radio access node according to some embodiments of the present disclosure.

FIG. 11 is a schematic block diagram that illustrates a virtualized embodiment of the radio access node 1000 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1000 in which at least a portion of the functionality of the radio access node 1000 is implemented as a virtual component(s) (e.g., via a virtual machine(s) executing on a physical processing node(s) in a network(s)). As illustrated, in this example, the radio access node 1000 may include the control system 1002 and/or the one or more radio units 1010, as described above. The control system 1002 may be connected to the radio unit(s) 1010 via, for example, an optical cable or the like.

The radio access node 1000 includes one or more processing nodes 1100 coupled to or included as part of a network(s) 1102. If present, the control system 1002 or the radio unit(s) are connected to the processing node(s) 1100 via the network 1102. Each processing node 1100 includes one or more processors 1104 (e.g., CPUs, ASICs, FPGAs, and/or the like), memory 1106, and a network interface 1108.

In this example, functions 1110 of the radio access node 1000 described herein are implemented at the one or more processing nodes 1100 or distributed across the one or more processing nodes 1100 and the control system 1002 and/or the radio unit(s) 1010 in any desired manner. In some particular embodiments, some or all of the functions 1110 of the radio access node 1000 described herein are implemented as virtual components executed by one or more virtual machines implemented in a virtual environment(s) hosted by the processing node(s) 1100. As will be appreciated by one of ordinary skill in the art, additional signaling or communication between the processing node(s) 1100 and the control system 1002 is used in order to carry out at least some of the desired functions 1110. Notably, in some embodiments, the control system 1002 may not be included, in which case the radio unit(s) 1010 communicates directly with the processing node(s) 1100 via an appropriate network interface(s).

In some embodiments, a computer program including instructions which, when executed by at least one processor, causes the at least one processor to carry out the functionality of radio access node 1000 or a node (e.g., a processing node 1100) implementing one or more of the functions 1110 of the radio access node 1000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
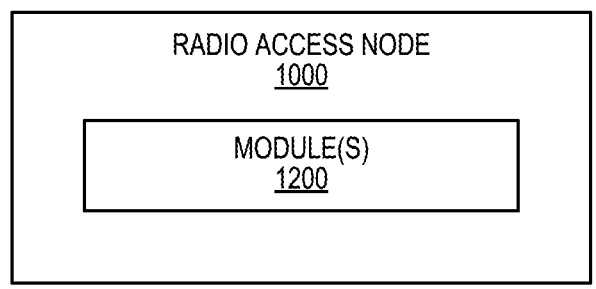
FIG. 12 is a schematic block diagram of the radio access node according to some other embodiments of the present disclosure.

FIG. 12 is a schematic block diagram of the radio access node 1000 according to some other embodiments of the present disclosure. The radio access node 1000 includes one or more modules 1200, each of which is implemented in software. The module(s) 1200 provide the functionality of the radio access node 1000 described herein. This discussion is equally applicable to the processing node 1100 of FIG. 11 where the modules 1200 may be implemented at one of the processing nodes 1100 or distributed across multiple processing nodes 1100 and/or distributed across the processing node(s) 1100 and the control system 1002.

Figure 13:
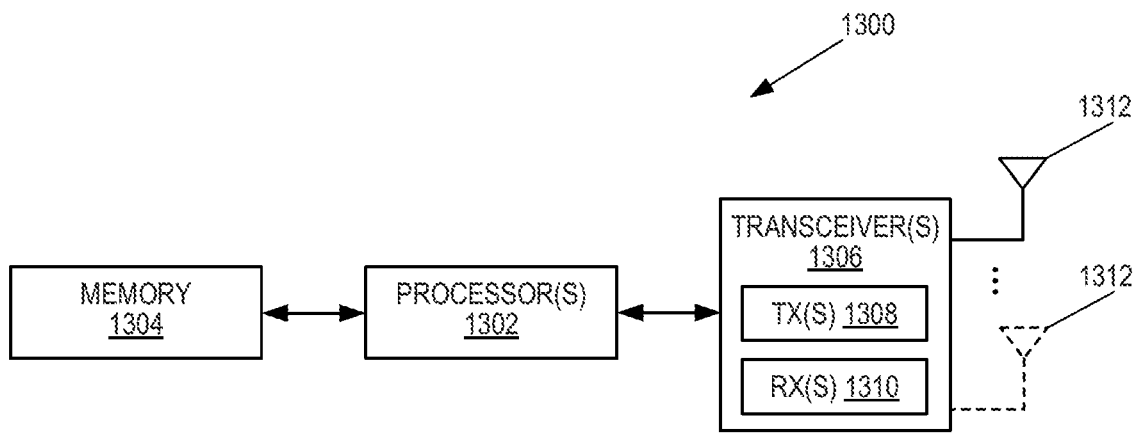
FIG. 13 is a schematic block diagram of a wireless communication device according to some embodiments of the present disclosure.

FIG. 13 is a schematic block diagram of a wireless communication device 1300 according to some embodiments of the present disclosure. As illustrated, the wireless communication device 1300 includes one or more processors 1302 (e.g., CPUs, ASICs, FPGAs, and/or the like), memory 1304, and one or more transceivers 1306 each including one or more transmitters 1308 and one or more receivers 1310 coupled to one or more antennas 1312. The transceiver(s) 1306 includes radio-front end circuitry connected to the antenna(s) 1312 that is configured to condition signals communicated between the antenna(s) 1312 and the processor(s) 1302, as will be appreciated by on of ordinary skill in the art. The processors 1302 are also referred to herein as processing circuitry. The transceivers 1306 are also referred to herein as radio circuitry. In some embodiments, the functionality of the wireless communication device 1300 described above may be fully or partially implemented in software that is, e.g., stored in the memory 1304 and executed by the processor(s) 1302. Note that the wireless communication device 1300 may include additional components not illustrated in FIG. 13 such as, e.g., one or more user interface components (e.g., an input/output interface including a display, buttons, a touch screen, a microphone, a speaker(s), and/or the like and/or any other components for allowing input of information into the wireless communication device 1300 and/or allowing output of information from the wireless communication device 1300), a power supply (e.g., a battery and associated power circuitry), etc.

In some embodiments, a computer program including instructions which, when executed by at least one processor, causes the at least one processor to carry out the functionality of the wireless communication device 1300 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
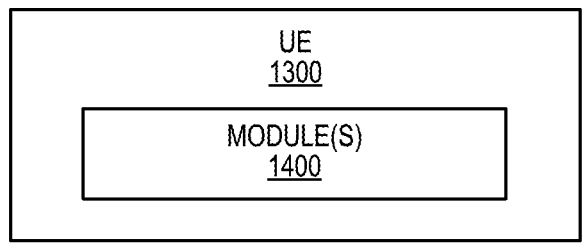
FIG. 14 is a schematic block diagram of the wireless communication device according to some other embodiments of the present disclosure.

FIG. 14 is a schematic block diagram of the wireless communication device 1300 according to some other embodiments of the present disclosure. The wireless communication device 1300 includes one or more modules 1400, each of which is implemented in software. The module(s) 1400 provide the functionality of the wireless communication device 1300 described herein.

Figure 15:
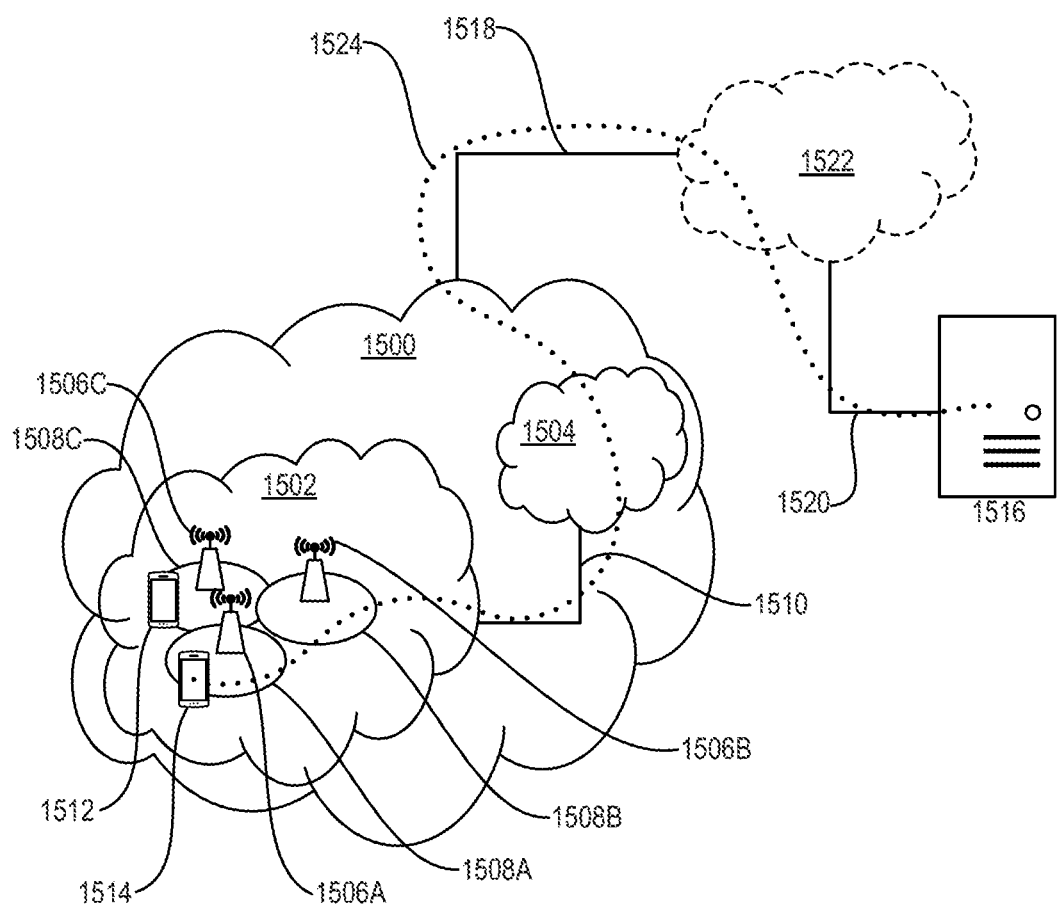
FIG. 15 is a schematic block diagram of a communication system that includes a telecommunication network, such as a 3GPP-type cellular network, which comprises an access network, such as a Radio Access Network (RAN), and a core network.

With reference to FIG. 15, in accordance with an embodiment, a communication system includes a telecommunication network 1500, such as a 3GPP-type cellular network, which comprises an access network 1502, such as a RAN, and a core network 1504. The access network 1502 comprises a plurality of base stations 1506A, 1506B, 1506C, such as Node Bs, eNBs, gNBs, or other types of wireless Access Points (APs), each defining a corresponding coverage area 1508A, 1508B, 1508C. Each base station 1506A, 1506B, 1506C is connectable to the core network 1504 over a wired or wireless connection 1510. A first UE 1512 located in coverage area 1508C is configured to wirelessly connect to, or be paged by, the corresponding base station 1506C. A second UE 1514 in coverage area 1508A is wirelessly connectable to the corresponding base station 1506A. While a plurality of UEs 1512, 1514 are illustrated in this example, the disclosed embodiments are equally applicable to a situation where a sole UE is in the coverage area or where a sole UE is connecting to the corresponding base station 1506.

The telecommunication network 1500 is itself connected to a host computer 1516, which may be embodied in the hardware and/or software of a standalone server, a cloud-implemented server, a distributed server, or as processing resources in a server farm. The host computer 1516 may be under the ownership or control of a service provider, or may be operated by the service provider or on behalf of the service provider. Connections 1518 and 1520 between the telecommunication network 1500 and the host computer 1516 may extend directly from the core network 1504 to the host computer 1516 or may go via an optional intermediate network 1522. The intermediate network 1522 may be one of, or a combination of more than one of, a public, private, or hosted network; the intermediate network 1522, if any, may be a backbone network or the Internet; in particular, the intermediate network 1522 may comprise two or more sub-networks (not shown).

The communication system of FIG. 15 as a whole enables connectivity between the connected UEs 1512, 1514 and the host computer 1516. The connectivity may be described as an Over-the-Top (OTT) connection 1524. The host computer

1516 and the connected UEs 1512, 1514 are configured to communicate data and/or signaling via the OTT connection 1524, using the access network 1502, the core network 1504, any intermediate network 1522, and possible further infrastructure (not shown) as intermediaries. The OTT connection 1524 may be transparent in the sense that the participating communication devices through which the OTT connection 1524 passes are unaware of routing of uplink and downlink communications. For example, the base station 1506 may not or need not be informed about the past routing of an incoming downlink communication with data originating from the host computer 1516 to be forwarded (e.g., handed over) to a connected UE 1512. Similarly, the base station 1506 need not be aware of the future routing of an outgoing uplink communication originating from the UE 1512 towards the host computer 1516.

Example implementations, in accordance with an embodiment, of the UE, base station, and host computer discussed in the preceding paragraphs will now be described with reference to FIG. 16. In a communication system 1600, a host computer 1602 comprises hardware 1604 including a communication interface 1606 configured to set up and maintain a wired or wireless connection with an interface of a different communication device of the communication system 1600. The host computer 1602 further comprises processing circuitry 1608, which may have storage and/or processing capabilities. In particular, the processing circuitry 1608 may comprise one or more programmable processors, ASICs, FPGAs, or combinations of these (not shown) adapted to execute instructions. The host computer 1602 further comprises software 1610, which is stored in or accessible by the host computer 1602 and executable by the processing circuitry 1608. The software 1610 includes a host application 1612. The host application 1612 may be operable to provide a service to a remote user, such as a UE 1614 connecting via an OTT connection 1616 terminating at the UE 1614 and the host computer 1602. In providing the service to the remote user, the host application 1612 may provide user data which is transmitted using the OTT connection 1616.

The communication system 1600 further includes a base station 1618 provided in a telecommunication system and comprising hardware 1620 enabling it to communicate with the host computer 1602 and with the UE 1614. The hardware 1620 may include a communication interface 1622 for setting up and maintaining a wired or wireless connection with an interface of a different communication device of the communication system 1600, as well as a radio interface 1624 for setting up and maintaining at least a wireless connection 1626 with the UE 1614 located in a coverage area (not shown in FIG. 16) served by the base station 1618. The communication interface 1622 may be configured to facilitate a connection 1628 to the host computer 1602. The connection 1628 may be direct or it may pass through a core network (not shown in FIG. 16) of the telecommunication system and/or through one or more intermediate networks outside the telecommunication system. In the embodiment shown, the hardware 1620 of the base station 1618 further includes processing circuitry 1630, which may comprise one or more programmable processors, ASICs, FPGAs, or combinations of these (not shown) adapted to execute instructions. The base station 1618 further has software 1632 stored internally or accessible via an external connection.

The communication system 1600 further includes the UE 1614 already referred to. The UE's 1614 hardware 1634 may include a radio interface 1636 configured to set up and maintain a wireless connection 1626 with a base station serving a coverage area in which the UE 1614 is currently located. The hardware 1634 of the UE 1614 further includes processing circuitry 1638, which may comprise one or more programmable processors, ASICs, FPGAs, or combinations of these (not shown) adapted to execute instructions. The UE 1614 further comprises software 1640, which is stored in or accessible by the UE 1614 and executable by the processing circuitry 1638. The software 1640 includes a client application 1642. The client application 1642 may be operable to provide a service to a human or non-human user via the UE 1614, with the support of the host computer 1602. In the host computer 1602, the executing host application 1612 may communicate with the executing client application 1642 via the OTT connection 1616 terminating at the UE 1614 and the host computer 1602. In providing the service to the user, the client application 1642 may receive request data from the host application 1612 and provide user data in response to the request data. The OTT connection 1616 may transfer both the request data and the user data. The client application 1642 may interact with the user to generate the user data that it provides.

Figure 16:
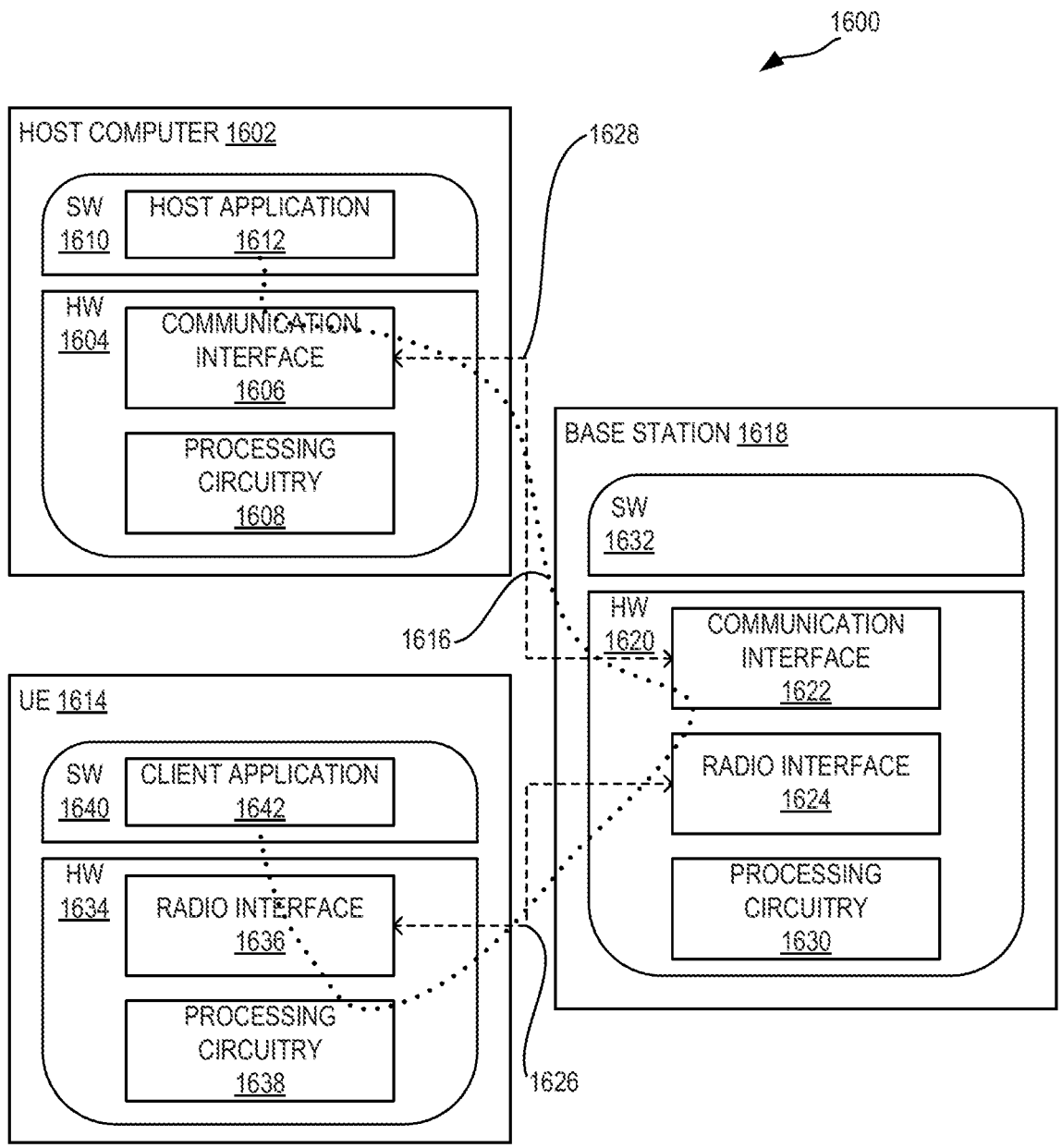
FIG. 16 is a schematic block diagram of a communication system in accordance with an embodiment of the present disclosure.

It is noted that the host computer 1602, the base station 1618, and the UE 1614 illustrated in FIG. 16 may be similar or identical to the host computer 1516, one of the base stations 1506A, 1506B, 1506C, and one of the UEs 1512, 1514 of FIG. 15, respectively. This is to say, the inner workings of these entities may be as shown in FIG. 16 and independently, the surrounding network topology may be that of FIG. 15.

In FIG. 16, the OTT connection 1616 has been drawn abstractly to illustrate the communication between the host computer 1602 and the UE 1614 via the base station 1618 without explicit reference to any intermediary devices and the precise routing of messages via these devices. The network infrastructure may determine the routing, which may be configured to hide from the UE 1614 or from the service provider operating the host computer 1602, or both. While the OTT connection 1616 is active, the network infrastructure may further take decisions by which it dynamically changes the routing (e.g., on the basis of load balancing consideration or reconfiguration of the network).

The wireless connection 1626 between the UE 1614 and the base station 1618 is in accordance with the teachings of the embodiments described throughout this disclosure. One or more of the various embodiments improve the performance of OTT services provided to the UE 1614 using the OTT connection 1616, in which the wireless connection 1626 forms the last segment.

A measurement procedure may be provided for the purpose of monitoring data rate, latency, and other factors on which the one or more embodiments improve. There may further be an optional network functionality for reconfiguring the OTT connection 1616 between the host computer 1602 and the UE 1614, in response to variations in the measurement results. The measurement procedure and/or the network functionality for reconfiguring the OTT connection 1616 may be implemented in the software 1610 and the hardware 1604 of the host computer 1602 or in the software 1640 and the hardware 1634 of the UE 1614, or both. In some embodiments, sensors (not shown) may be deployed in or in association with communication devices through which the OTT connection 1616 passes; the sensors may participate in the measurement procedure by supplying values of the monitored quantities exemplified above, or supplying values of other physical quantities from which the software 1610, 1640 may compute or estimate the monitored quantities. The reconfiguring of the OTT connection 1616 may include message format, retransmission settings, preferred routing, etc.; the reconfiguring need not affect the base station 1618, and it may be unknown or imperceptible to the base station 1618. Such procedures and functionalities may be known and practiced in the art. In certain embodiments, measurements may involve proprietary UE signaling facilitating the host computer 1602's measurements of throughput, propagation times, latency, and the like. The measurements may be implemented in that the software 1610 and 1640 causes messages to be transmitted, in particular empty or 'dummy' messages, using the OTT connection 1616 while it monitors propagation times, errors, etc.

FIG. 17 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 17 will be included in this section. In step 1700 (which may be optional), the UE receives input data provided by the host computer. Additionally or alternatively, in step 1702, the UE provides user data. In sub-step 1704 (which may be optional) of step 1700, the UE provides the user data by executing a client application. In sub-step 1706 (which may be optional) of step 1702, the UE executes a client application which provides the user data in reaction to the received input data provided by the host computer. In providing the user data, the executed client application may further consider user input received from the user. Regardless of the specific manner in which the user data was provided, the UE initiates, in sub-step 1708 (which may be optional), transmission of the user data to the host computer. In step 1710 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 18 will be included in this section. In step 1800 (which may be optional), in accordance with the teachings of the embodiments described throughout this disclosure, the base station receives user data from the UE. In step 1802 (which may be optional), the base station initiates transmission of the received user data to the host computer. In step 1804 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some exemplary embodiments of the present disclosure are as follows.

Embodiment 1: A method performed by a wireless device for adapting maximum allowed CCA based on operational occasion periodicity, the method comprising one or more of the following actions: determining (400) an operational occasion periodicity of a signal subjecting to CCA for transmission; determining (402) an association between the determined operational occasion periodicity and a maximum number of allowed CCA failures for communicating the signal; determining (404) the maximum number of allowed CCA failures for the determined operational occasion periodicity based on the determined association between the determined operational occasion periodicity and the maximum number of allowed CCA failures; and communicating (406) the signal based on the determined maximum number of allowed CCA failures.

Embodiment 2: The method of any of the previous embodiments, further comprising, if the maximum number of allowed CCA failures is exceeded, performing one or more tasks selected from the group consisting of: restarting the operation, stopping the operation, suspending transmission in uplink, transmitting in uplink with a transmission timing error larger than the timing error allowed, declaring RLF, triggering a cell change, triggering measurements on another cell or another carrier.

Embodiment 3: The method of any of the previous embodiments, further comprising determining information related to the operational occasion periodicity based on pre-defined configuration information and/or by receiving configuration information from a network node (e.g., from a serving base station in an RRC message in dedicated channel or in system information).

Embodiment 4: The method of any of the previous embodiments, further comprising determining the association between the determined operational occasion periodicity and the maximum number of allowed CCA failures based on a rule, wherein the rule can be pre-defined and/or determined by the wireless device by receiving the configuration information from the network node.

Embodiment 5: The method of any of the previous embodiments, further comprising determining the association between the determined operational occasion periodicity and the maximum number of allowed CCA failures based on one or more of the following parameters: a type of the procedure (e.g., cell change, cell reselection, handover, measurements, operation with DRX, etc.); direction of operation (e.g., uplink or downlink); type of signal to be communicated (e.g., SSB, CSI-RS, RACH, SRS, SI, paging, etc.); periodic receiver or transmitter activity pattern (e.g., when the wireless device is configured with DRX cycles of a certain length); measurement pattern or periodicity or measurement cycle, and measurement gap pattern; type of cell (e.g., PCell, PScell, Scell, etc.); and availability of historic data on CCA success (and failure) on a relevant carrier.

Embodiment 6: The method of any of the previous embodiments, further comprising communicating the signal based on the determined maximum number of allowed CCA failures in the determined operational occasion occurring once in each operational occasion periodicity.

Embodiment 7: A method performed by a wireless device for adapting maximum allowed CCA based on operational occasion periodicity, the method comprising one or more of the following actions: determining (500) an operational occasion periodicity of a signal subjecting to CCA for transmission; determining (502) an RRC_state of the wireless device configured to communicate a signal based on the determined operational occasion periodicity; determining (504) an association between the determined operational occasion periodicity, the RRC_state, and a maximum number of allowed CCA failures for communicating the signal; determining (506) the maximum number of allowed CCA failures for the determined operational occasion periodicity based on the determined association between the determined operational occasion periodicity and the maximum number of allowed CCA failures; and communicating (508) the signal based on the determined maximum number of allowed CCA failures.

Embodiment 8: The method of embodiment 7, further comprising determining information related to the operational occasion periodicity based on pre-defined configuration information and/or by receiving configuration information from a network node (e.g., from a serving base station in an RRC message in dedicated channel or in system information).

Embodiment 9: A method performed by a wireless device for adapting maximum allowed CCA based on operational occasion periodicity, the method comprising one or more of the following actions: determining (600) an operational occasion periodicity of a signal subjecting to CCA for transmission; determining (602) information related to measurement capability of the wireless device; determining (604) an association between the determined operational occasion periodicity, the measurement capability, and a maximum allowed CCA failures for communicating the signal; determining (606) the maximum number of allowed CCA failures for the determined operational occasion periodicity based on the determined association between the determined operational occasion periodicity and the maximum number of allowed CCA failures; and communicating (608) the signal based on the determined maximum number of allowed CCA failures.

Embodiment 10: The method of embodiment 9, further comprising determining information related to the operational occasion periodicity based on pre-defined configuration information and/or by receiving configuration information from a network node (e.g., from a serving base station in an RRC message in dedicated channel or in system information).

Embodiment 11: The method of any of the previous embodiments, further comprising determining the information related to measurement capability of the wireless device based on one or more of the following: number or carriers the wireless device is monitoring, number of carriers is configured to monitor, and number of carriers the wireless device is configured to support; and number of cells the wireless device has identified (e.g., number of neighbor cells the wireless device has identified and is monitoring).

Embodiment 12: A method performed by a base station for adapting maximum allowed CCA based on operational occasion periodicity, the method comprising one or more of the following actions: determining (700) an association between an operational occasion periodicity and a maximum number of allowed CCA failures for communicating a signal; determining (702) the maximum number of allowed CCA failures for the determined operational occasion periodicity based on the determined association between the determined operational occasion periodicity and the maximum number of allowed CCA failures; and configuring (704) a wireless device to communicate the signal based on the determined association.

Embodiment 13: The method of any of the previous embodiments, further comprising communicating a message comprising the determined association to the wireless device.

Embodiment 14: The method of any of the previous embodiments, further comprising: obtaining user data; and forwarding the user data to a host computer or a wireless device.

Embodiment 15: A wireless device for adapting maximum allowed CCA based on operational occasion periodicity, the wireless device comprising: processing circuitry configured to perform any of the steps of any of the Group A embodiments; and power supply circuitry configured to supply power to the wireless device.

Embodiment 16: A base station for adapting maximum allowed CCA based on operational occasion periodicity, the base station comprising: processing circuitry configured to perform any of the steps of any of the Group B embodiments; and power supply circuitry configured to supply power to the base station.

Embodiment 17: A User Equipment, UE, for adapting maximum allowed CCA based on operational occasion periodicity, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 18: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 19: The communication system of the previous embodiment further including the base station.

Embodiment 20: The communication system of the previous 2 embodiments, further including the UE, wherein the UE is configured to communicate with the base station.

Embodiment 21: The communication system of the previous 3 embodiments, wherein: the processing circuitry of the host computer is configured to execute a host application, thereby providing the user data; and the UE comprises processing circuitry configured to execute a client application associated with the host application.

Embodiment 22: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 23: The method of the previous embodiment, further comprising, at the base station, transmitting the user data.

Embodiment 24: The method of the previous 2 embodiments, wherein the user data is provided at the host computer by executing a host application, the method further comprising, at the UE, executing a client application associated with the host application.

Embodiment 25: A User Equipment, UE, configured to communicate with a base station, the UE comprising a radio interface and processing circuitry configured to perform the method of the previous 3 embodiments.

Embodiment 26: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 27: The communication system of the previous embodiment, wherein the cellular network further includes a base station configured to communicate with the UE.

Embodiment 28: The communication system of the previous 2 embodiments, wherein: the processing circuitry of the host computer is configured to execute a host application, thereby providing the user data; and the UE's processing circuitry is configured to execute a client application associated with the host application.

Embodiment 29: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 30: The method of the previous embodiment, further comprising at the UE, receiving the user data from the base station.

Embodiment 31: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 32: The communication system of the previous embodiment, further including the UE.

Embodiment 33: The communication system of the previous 2 embodiments, further including the base station, wherein the base station comprises a radio interface configured to communicate with the UE and a communication interface configured to forward to the host computer the user data carried by a transmission from the UE to the base station.

Embodiment 34: The communication system of the previous 3 embodiments, wherein: the processing circuitry of the host computer is configured to execute a host application; and the UE's processing circuitry is configured to execute a client application associated with the host application, thereby providing the user data.

Embodiment 35: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 36: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 37: The method of the previous embodiment, further comprising, at the UE, providing the user data to the base station.

Embodiment 38: The method of the previous 2 embodiments, further comprising: at the UE, executing a client application, thereby providing the user data to be transmitted; and at the host computer, executing a host application associated with the client application.

Embodiment 39: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 40: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 41: The communication system of the previous embodiment further including the base station.

Embodiment 42: The communication system of the previous 2 embodiments, further including the UE, wherein the UE is configured to communicate with the base station.

Embodiment 43: The communication system of the previous 3 embodiments, wherein: the processing circuitry of the host computer is configured to execute a host application; and the UE is configured to execute a client application associated with the host application, thereby providing the user data to be received by the host computer.

Embodiment 44: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 45: The method of the previous embodiment, further comprising at the base station, receiving the user data from the UE.

Embodiment 46: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

- 3GPP Third Generation Partnership Project
- 5G Fifth Generation
- 5GC Fifth Generation Core
- 5GS Fifth Generation System
- AMF Access and Mobility Function
- AN Access Network
- AP Access Point
- ASIC Application Specific Integrated Circuit
- AUSF Authentication Server Function
- BS Base Station
- CCA Clear Channel Assessment
- COT Channel Occupancy Time
- CPU Central Processing Unit
- CSI-RS Channel State Information Reference Signal
- DRS Discovery Reference Signal
- DRX Discontinuous Transmission
- DSP Digital Signal Processor
- eNB Enhanced or Evolved Node B
- E-UTRA Evolved Universal Terrestrial Radio Access
- FPGA Field Programmable Gate Array
- gNB New Radio Base Station
- gNB-DU New Radio Base Station Distributed Unit
- HSS Home Subscriber Server
- IAB Integrated Access Backhaul
- IoT Internet of Things
- LBT Listen-Before-Talk
- LTE Long Term Evolution
- LTE-LAA Long Term Evolution-License Assisted Access
- MCOT Maximum Channel Occupancy Time
- MME Mobility Management Entity
- MSR Multi-Standard Radio
- MTC Machine Type Communication
- NEF Network Exposure Function
- NF Network Function
- NR New Radio
- NRF Network Function Repository Function
- NSSF Network Slice Selection Function
- OTT Over-the-Top
- PBCH Physical Broadcast Channel
- PC Personal Computer
- Pcell Primary Cell
- PCF Policy Control Function
- P-GW Packet Data Network Gateway
- PRACH Physical Random Access Channel
- PScell Primary Secondary Cell
- RACH Random Access Channel
- RAM Random Access Memory
- RAN Radio Access Network
- RLF Radio Link Failure
- RLM Radio Link Monitoring
- RNC Radio Network Controller
- ROM Read Only Memory
- RRC Radio Resource Control
- RRH Remote Radio Head
- RRM Radio Resource Measurement
- SCEF Service Capability Exposure Function
- Scell Secondary Cell
- SMF Session Management Function
- SMTC Measurement Timing Configuration
- SRS Sounding Reference Signal
- SS Synchronization Signal
- SSB Synchronization Signal Block
- UDM Unified Data Management
- UE User Equipment
- UPF User Plane Function Those skilled in the art will recognize improvements and modifications to the embodiments of the present disclosure. All such improvements and modifications are considered within the scope of the concepts disclosed herein.

What is claimed is:

1. A method performed by a wireless device, the method comprising:
   determining an operational occasion periodicity of a signal subjecting to Clear Channel Assessment, CCA, for transmission;
   determining an association at least between the determined operational occasion periodicity and a maximum number of allowed CCA failures for communicating the signal;
   determining the maximum number of allowed CCA failures for the determined operational occasion periodicity based on the determined association between the determined operational occasion periodicity and the maximum number of allowed CCA failures; and
   performing one or more operational tasks based on the determined maximum number of allowed CCA failures, wherein
   determining the association at least between the determined operational occasion periodicity and the maximum number of allowed CCA failures for communicating the signal comprises:
   determining a Radio Resource Control, RRC, state, RRC state, of the wireless device configured to communicate the signal based on the determined operational occasion periodicity; and
   determining the association between the determined operational occasion periodicity, the RRC state, and the maximum allowed CCA failures for communicating the signal.

2. The method of claim 1, wherein performing one or more operational tasks comprises communicating the signal with a network node based on the determined maximum number of allowed CCA failures.

3. The method of claim 1, further comprising, if the maximum number of allowed CCA failures is exceeded, performing one or more of the following tasks:
   restarting an operation associated with communicating the signal;
   stopping the operation associated with communicating the signal;
   declaring a Radio Link Failure, RLF;
   triggering a cell change;
   triggering measurements on another cell or another carrier;
   declaring a measurement failure;
   reporting a measurement with an approximate indication;
   suspending transmission in uplink; and
   transmitting in uplink with a transmission timing error larger than a timing error allowed when the maximum number of allowed CCA failures is not exceeded.

4. The method of claim 1, wherein determining the operational occasion periodicity comprises determining the operational occasion periodicity based on at least one of:
   pre-defined configuration information; and
   configuration information received from the network node.

5. The method of claim 4, wherein determining the association at least between the determined operational occasion periodicity and the maximum number of allowed CCA failures comprises determining the association at least between the determined operational occasion periodicity and the maximum number of allowed CCA failures based on a rule.

6. The method of claim 5, wherein the rule is pre-defined.

7. The method of claim 5, wherein the rule is determined by the wireless device based on the configuration information received from the network node.

8. The method of claim 1, wherein:
the network node comprises a serving base station; and
determining the operational occasion periodicity comprises determining the operational occasion periodicity based on configuration information received from the network node in a Radio Resource Control, RRC, message or in a System Information, SI, message.

9. The method of claim 1, wherein determining the association at least between the determined operational occasion periodicity and the maximum number of allowed CCA failures comprises determining the association at least between the determined operational occasion periodicity and the maximum number of allowed CCA failures based on one or more of following parameters:
a type of procedure associated with communicating the signal, wherein the type of procedure comprises at least one of a cell change, a cell reselection, a handover, a measurement, and an operation using Discontinuous Transmission, DRX;
a direction of the signal communicated with the network node, wherein the direction comprises at least one of an uplink operation and a downlink operation;
a type of the signal communicated with the network node, wherein the type of signal comprises at least one of a Synchronization Signal Block, SSB, a Channel State Information Reference Signal, CSI-RS, a Random Access Channel, RACH, signal, a Sounding Reference Signal, SRS, an SI signal, and a paging signal;
a periodic receiver activity pattern or a periodic transmitter activity pattern of the signal communicated with the network node;
a measurement pattern, a measurement periodicity, a measurement cycle, and a measurement gap pattern of the signal communicated with the network node;
a type of cell of the network node, wherein the type of cell comprises at least one of a Primary Cell, PCell, a Primary Secondary Cell, PScell, and a Secondary Cell, Scell; and
availability of historic data on CCA success and/or failure on a relevant carrier for communicating the RF signal with the network node.

10. The method of claim 1, wherein determining the maximum number of allowed CCA failures for the determined operational occasion periodicity comprises determining the maximum number of allowed CCA failures for the determined operational occasion periodicity based on a predefined table comprising:
at least one first value of a maximum number of allowed CCA failures corresponding to at least one first value of the operational occasion periodicity; and
at least one second value of a maximum number of allowed CCA failures corresponding to at least one second value of the operational occasion periodicity;
wherein:
the at least one second value of the maximum number of allowed CCA failures is greater than the at least one first value of the maximum number of allowed CCA failures; and the at least one second value of the operational occasion periodicity is greater than the at least one first value of the operational occasion periodicity.

11. The method of claim 1, wherein the operational occasion periodicity comprises:
a Physical Random Access Channel, PRACH, Configuration periodicity;
a PRACH periodicity;
a Synchronization Signal Block, SSB, based Radio Resource Measurement, RRM, Measurement Timing Configuration, SMTC, periodicity;
a Discontinuous Transmission, DRX, periodicity; and
a Channel State Information Reference Signal, CSI-RS, periodicity.

12. The method of claim 1, wherein determining the association at least between the determined operational occasion periodicity and the maximum number of allowed CCA failures for communicating the signal comprises:
determining information related to measurement capability of the wireless device; and
determining the association between the determined operational occasion periodicity, the measurement capability, and the maximum allowed CCA failures for communicating the signal.

13. The method of claim 12, wherein determining the information related to measurement capability of the wireless device comprises determining the information related to measurement capability of the wireless device based on one or more of the following:
number of carriers the wireless device is configured to monitor;
number of carriers the wireless device is configured to support; and
number of neighbor cells the wireless device has identified and is monitoring.

14. A wireless device, comprising:
processing circuitry configured to:
determine an operational occasion periodicity of a signal subjecting to Clear Channel Assessment, CCA, for transmission;
determine an association at least between the determined operational occasion periodicity and a maximum number of allowed CCA failures for communicating the signal;
determine the maximum number of allowed CCA failures for the determined operational occasion periodicity based on the determined association between the determined operational occasion periodicity and the maximum number of allowed CCA failures; and
perform one or more operational tasks based on the determined maximum number of allowed CCA failures; and
power supply circuitry configured to supply power to the wireless device, wherein determining the association at least between the determined operational occasion periodicity and the maximum number of allowed CCA failures for communicating the signal comprises:
determining a Radio Resource Control, RRC, state, RRC state, of the wireless device configured to communicate the signal based on the determined operational occasion periodicity; and
determining the association between the determined operational occasion periodicity, the RRC state, and the maximum allowed CCA failures for communicating the signal.

15. A method performed by a base station, the method comprising:
- determining an association between an operational occasion periodicity and a maximum number of allowed Clear Channel Assessment, CCA, failures for communicating a signal;
- determining the maximum number of allowed CCA failures for the determined operational occasion periodicity based on the determined association between the determined operational occasion periodicity and the maximum number of allowed CCA failures; and
- configuring a wireless device to perform one or more operational tasks based on the determined association, wherein
  - determining the association at least between the determined operational occasion periodicity and the maximum number of allowed CCA failures for communicating the signal comprises:
    - determining a Radio Resource Control, RRC, state, RRC state, of the wireless device configured to communicate the signal based on the determined operational occasion periodicity; and
    - determining the association between the determined operational occasion periodicity, the RRC state, and the maximum allowed CCA failures for communicating the signal.

16. The method of claim 15, further comprising sending a message comprising the determined association to the wireless device.

17. The method of claim 15, wherein configuring the wireless device to perform one or more operational tasks comprises configuring the wireless device to communicate the signal based on the determined association.

18. A base station comprising:
- a control system configured to:
  - determine an association between an operational occasion periodicity and a maximum number of allowed Clear Channel Assessment, CCA, failures for communicating a signal;
  - determine the maximum number of allowed CCA failures for the determined operational occasion periodicity based on the determined association between the determined operational occasion periodicity and the maximum number of allowed CCA failures; and
  - configure a wireless device to communicate the signal based on the determined association, wherein
    - determining the association at least between the determined operational occasion periodicity and the maximum number of allowed CCA failures for communicating the signal comprises:
      - determining a Radio Resource Control, RRC, state, RRC state, of the wireless device configured to communicate the signal based on the determined operational occasion periodicity; and
      - determining the association between the determined operational occasion periodicity, the RRC state, and the maximum allowed CCA failures for communicating the signal.

19. The base station of claim 18, wherein the control system is further configured to communicate a message comprising the determined association to the wireless device.

* * * * *